US010644550B2

(12) United States Patent
Takahashi

(10) Patent No.: US 10,644,550 B2
(45) Date of Patent: May 5, 2020

(54) ROTOR FOR ROTATING ELECTRIC MACHINE

(71) Applicant: DENSO CORPORATION, Kariya, Aichi-pref. (JP)

(72) Inventor: Yuki Takahashi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/523,187

(22) Filed: Jul. 26, 2019

(65) Prior Publication Data

US 2019/0348879 A1    Nov. 14, 2019

Related U.S. Application Data

(62) Division of application No. 15/140,615, filed on Apr. 28, 2016, now Pat. No. 10,411,535.

(30) Foreign Application Priority Data

Apr. 28, 2015 (JP) ................... 2015-092093

(51) Int. Cl.
*H02K 1/27* (2006.01)
*H02K 29/03* (2006.01)

(52) U.S. Cl.
CPC ........... *H02K 1/276* (2013.01); *H02K 1/2766* (2013.01); *H02K 29/03* (2013.01); *H02K 2213/03* (2013.01)

(58) Field of Classification Search
CPC .. H02K 1/276; H02K 1/2766; H02K 2213/03; H02K 29/03
USPC ............ 310/156.53, 156.56, 156.83, 156.07
See application file for complete search history.

(56) References Cited

U.S. PATENT DOCUMENTS

| 5,811,904 | A | 9/1998 | Tajima et al. |
| 6,008,559 | A | 12/1999 | Asano et al. |
| 6,128,753 | A | 10/2000 | Keeble et al. |
| 6,867,526 | B2 | 3/2005 | Mori et al. |
| 6,885,125 | B2 | 4/2005 | Inayama et al. |
| 8,102,091 | B2 | 1/2012 | Ionel |
| 2002/0112904 | A1 | 8/2002 | Matsunobu et al. |

(Continued)

FOREIGN PATENT DOCUMENTS

| JP | 2006-223052 A | 8/2006 |
| JP | 2008-199790 A | 8/2008 |

(Continued)

*Primary Examiner* — Alfonso Perez Borroto
*Assistant Examiner* — Ahmed Elnakib
(74) *Attorney, Agent, or Firm* — Oliff PLC

(57) ABSTRACT

A rotor for a rotating electric machine includes a hollow cylindrical rotor core and a plurality of permanent magnets. The rotor core has a plurality of magnet-receiving holes arranged in a circumferential direction thereof. The permanent magnets are received respectively in the magnet-receiving holes of the rotor core to form a plurality of magnetic poles the polarities of which alternate between north and south in the circumferential direction of the rotor core. Moreover, the rotor core further has a plurality of q-axis core portions each of which is located between one circumferentially-adjacent pair of the magnetic poles. For each of the q-axis core portions, a radially outer circumferential width center of the q-axis core portion is offset upstream in a direction of rotation of the rotor from a radially inner circumferential width center of the q-axis core portion.

8 Claims, 13 Drawing Sheets

(56) References Cited

U.S. PATENT DOCUMENTS

| | | |
|---|---|---|
| 2007/0084652 A1 | 4/2007 | Matsunobu et al. |
| 2007/0284961 A1 | 12/2007 | Takahashi et al. |
| 2009/0134732 A1 | 5/2009 | Shichijoh et al. |
| 2009/0224627 A1 | 9/2009 | Hino et al. |
| 2010/0148612 A1 | 6/2010 | Takemoto et al. |
| 2012/0091845 A1 | 4/2012 | Takemoto et al. |
| 2012/0098378 A1 | 4/2012 | Takemoto et al. |
| 2013/0020897 A1 | 1/2013 | Takizawa |
| 2013/0307363 A1 | 11/2013 | Sano et al. |
| 2016/0322872 A1 | 11/2016 | Takahashi |
| 2017/0317541 A1 | 11/2017 | Shimoda et al. |

FOREIGN PATENT DOCUMENTS

| | | | |
|---|---|---|---|
| JP | 2008-295282 A | | 12/2008 |
| JP | 2013070505 | * | 4/2013 |

* cited by examiner

ELECTRICAL ANGLE (DegE)

OFFSET ANGLE β (DegE)

ROTOR FOR ROTATING ELECTRIC MACHINE

CROSS-REFERENCE TO RELATED APPLICATION

This application is a divisional of U.S. application Ser. No. 15/140,615 filed Apr. 28, 2016, which is based on and claims priority under 35 U.S.C. 119 from Japanese Patent Application No. 2015-092093 filed on Apr. 28, 2015. The entire contents of the above applications are incorporated herein by reference.

BACKGROUND

1 Technical Field

The present invention relates to rotors for rotating electric machines that are used in, for example, motor vehicles as electric motors and electric generators.

2 Description of Related Art

There are known IPM (Interior Permanent Magnet) motors that have permanent magnets embedded in a rotor core. The IPM motors can use both reluctance torque and magnet torque, thereby achieving high efficiency. Therefore, the IPM motors are particularly suitable for use in hybrid and electric vehicles.

In addition, the IPM motors generally include a stator and a rotor disposed in radial opposition to the stator. The rotor includes a rotor core having a plurality of magnet-receiving holes arranged in a circumferential direction thereof and a plurality of permanent magnets each of which is received in one of the magnet-receiving holes of the rotor core. The permanent magnets form a plurality of magnetic poles, the polarities of which alternate between north and south in the circumferential direction of the rotor core.

Japanese Patent Application Publication No. JP2009124899A discloses an IPM synchronous motor that is designed to reduce the amount of permanent magnet material used and increase the total output torque.

Japanese Patent Application Publication No. JP2012161227A discloses a rotor for an IPM motor. In the rotor, each magnetic pole is formed of at least three permanent magnets. The rotor is designed to suppress magnetic saturation in each magnetic pole, thereby increasing the total output torque of the IPM motor.

However, in the known IPM motors, if the flux linkage is increased for the purpose of increasing the total output torque, torque ripple may occur due to magnetic saturation. In particular, in the rotors of the known IPM motors, it may be easy for magnetic saturation, which is the cause of torque reduction and torque ripple, to occur in q-axis core portions and those portions through which the permanent magnets are opposed to a stator. In addition, each of the q-axis core portions is located between one circumferentially-adjacent pair of the magnetic poles.

SUMMARY

According to one exemplary embodiment, there is provided a rotor for a rotating electric machine. The rotor includes a hollow cylindrical rotor core and a plurality of permanent magnets. The rotor core has a plurality of magnet-receiving holes arranged in a circumferential direction thereof. The permanent magnets are received respectively in the magnet-receiving holes of the rotor core to form a plurality of magnetic poles the polarities of which alternate between north and south in the circumferential direction of the rotor core. Moreover, the rotor core further has a plurality of q-axis core portions each of which is located between one circumferentially-adjacent pair of the magnetic poles. For each of the q-axis core portions, a radially outer circumferential width center of the q-axis core portion is offset upstream (or backward) in a direction of rotation of the rotor from a radially inner circumferential width center of the q-axis core portion.

According to another exemplary embodiment, there is provided a rotor for a rotating electric machine. The rotor includes a hollow cylindrical rotor core and a plurality of pairs of permanent magnets. The rotor core has a plurality of pairs of magnet-receiving holes arranged in a circumferential direction thereof. Each pair of the magnet-receiving holes is formed in a substantially V-shape that opens toward a radially outer periphery of the rotor core. Each pair of the permanent magnets is received in one of the substantially V-shaped pairs of magnet-receiving holes of the rotor core to form one magnetic pole. The magnetic pole has a centerline that radially extends through a rotational axis of the rotor core so as to circumferentially bisect the magnetic pole. Moreover, in the total output torque of the rotating electric machine, the percentage of reluctance torque is higher than the percentage of magnet torque. The rotor core further has a plurality of center magnet-receiving holes. Each of the center magnet-receiving holes is formed in a radially outer peripheral portion of the rotor core so as to be circumferentially centered between one of the substantially V-shaped pairs of magnet-receiving holes. The rotor further includes a plurality of center magnets. Each of the center magnets is received in one of the center magnet-receiving holes of the rotor core so that the center of the center magnet is offset downstream (or forward) in a direction of rotation of the rotor from the centerline of the magnetic pole that is formed by the pair of permanent magnets located respectively on opposite circumferential sides of the center magnet.

According to yet another exemplary embodiment, there is provided a rotor for a rotating electric machine. The rotor includes a hollow cylindrical rotor core and a plurality of permanent magnets. The rotor core has a plurality of magnet-receiving holes arranged in a circumferential direction thereof. The permanent magnets are received respectively in the magnet-receiving holes of the rotor core to form a plurality of magnetic poles the polarities of which alternate between north and south in the circumferential direction of the rotor core. Moreover, the rotor core further has a plurality of q-axis core portions each of which is located between one circumferentially-adjacent pair of the magnetic poles. For each of the q-axis core portions, a radially outer circumferential width center of the q-axis core portion is offset downstream in a direction of rotation of the rotor from a radially inner circumferential width center of the q-axis core portion.

According to still another exemplary embodiment, there is provided a rotor for a rotating electric machine. The rotor includes a hollow cylindrical rotor core and a plurality of pairs of permanent magnets. The rotor core has a plurality of pairs of magnet-receiving holes arranged in a circumferential direction thereof. Each pair of the magnet-receiving holes is formed in a substantially V-shape that opens toward a radially outer periphery of the rotor core. Each pair of the permanent magnets is received in one of the substantially V-shaped pairs of magnet-receiving holes of the rotor core to form one magnetic pole. The magnetic pole has a centerline that radially extends through a rotational axis of the rotor core so as to circumferentially bisect the magnetic pole. Moreover, the rotor core further has a plurality of q-axis core portions and a plurality of center magnet-receiving holes. Each of the q-axis core portions is located between one circumferentially-adjacent pair of the magnetic poles. Each of the center magnet-receiving holes is formed in a radially outer peripheral portion of the rotor core so as to be circumferentially centered between one of the substantially V-shaped pairs of magnet-receiving holes. For each of the q-axis core portions, a radially outer circumferential width center of the q-axis core portion is offset downstream in a direction of rotation of the rotor from a radially inner circumferential width center of the q-axis core portion. The rotor further includes a plurality of center magnets. Each of the center magnets is received in one of the center magnet-receiving holes of the rotor core so that the center of the center magnet is offset downstream in the direction of rotation of the rotor from the centerline of the magnetic pole that is formed by the pair of permanent magnets located respectively on opposite circumferential sides of the center magnet.

According to still yet another exemplary embodiment, there is provided a rotor for a rotating electric machine. The rotor includes a hollow cylindrical rotor core and a plurality of pairs of permanent magnets. The rotor core has a plurality of pairs of magnet-receiving holes arranged in a circumferential direction thereof. Each pair of the magnet-receiving holes is formed in a substantially V-shape that opens toward a radially outer periphery of the rotor core. Each pair of the permanent magnets is received in one of the substantially V-shaped pairs of magnet-receiving holes of the rotor core to form one magnetic pole. The magnetic pole has a centerline that radially extends through a rotational axis of the rotor core so as to circumferentially bisect the magnetic pole. Moreover, the rotor core further has a plurality of q-axis core portions and a plurality of center magnet-receiving holes. Each of the q-axis core portions is located between one circumferentially-adjacent pair of the magnetic poles. Each of the center magnet-receiving holes is formed in a radially outer peripheral portion of the rotor core so as to be circumferentially centered between one of the substantially V-shaped pairs of magnet-receiving holes. For each of the q-axis core portions, a radially outer circumferential width center of the q-axis core portion is circumferentially offset by a predetermined offset angle $\theta$ from a radially inner circumferential width center of the q-axis core portion. The rotor further includes a plurality of center magnets. Each of the center magnets is received in one of the center magnet-receiving holes of the rotor core so that the center of the center magnet is circumferentially offset by a predetermined offset angle $\beta$ from the centerline of the magnetic pole that is formed by the pair of permanent magnets located respectively on opposite circumferential sides of the center magnet. The sum of the predetermined offset angle $\theta$ and the predetermined offset angle $\beta$ is set so as to have a difference in phase between reluctance torque and magnet torque of the rotating electric machine substantially equal to 30° in electrical angle.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
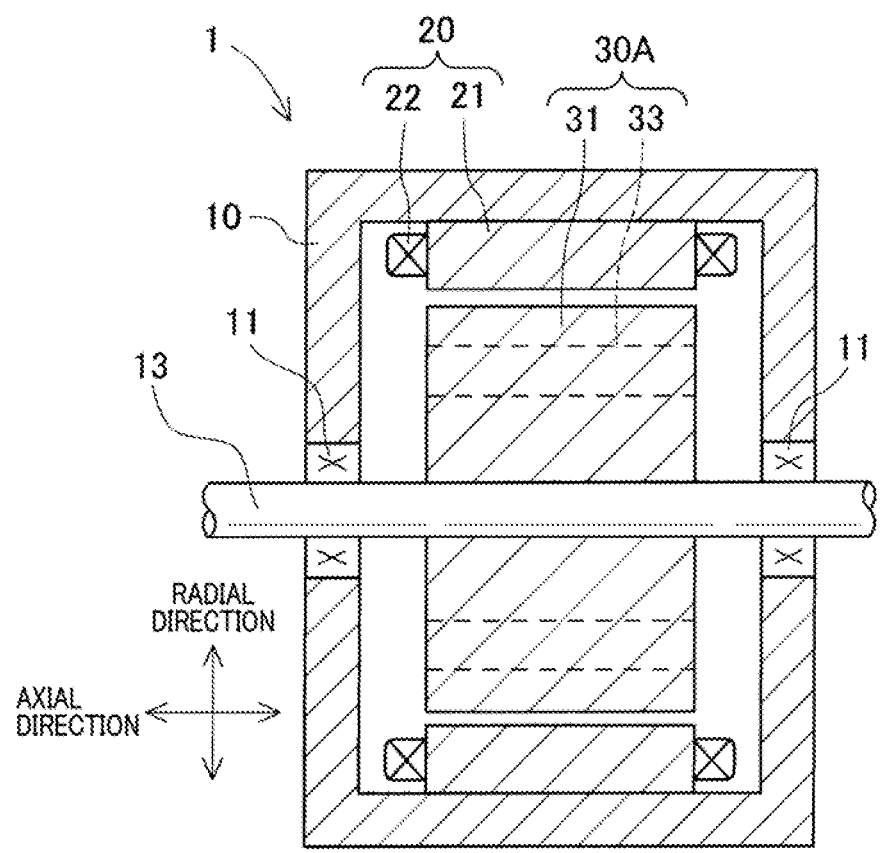
FIG. 1 is a schematic cross-sectional view, along an axial direction, of a rotating electric machine which includes a rotor according to a first embodiment.

Exemplary embodiments will be described hereinafter with reference to FIGS. 1-17. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotating electric machine 1 which includes a rotor 30A according to a first embodiment.

In the present embodiment, the rotating electric machine 1 is configured as an IPM motor for use in a motor vehicle.

As shown in FIG. 1, the rotating electric machine 1 includes a housing 10, a stator 20 that functions as an armature, and the rotor 30A that functions as a field.

The housing 10 is substantially hollow cylindrical-shaped and has both axial ends thereof closed.

The stator 20 includes an annular stator core 21 and a three-phase stator coil 22. The stator core 21 has a plurality of slots (not shown) formed in a radially inner peripheral portion thereof; the slots are spaced from one another in a circumferential direction of the stator core 21. The stator coil 22 is wound on the stator core 21 so as to be partially received in the slots of the stator core 21. In addition, the stator 20 is retained in the housing 10 with a radially outer surface of the stator core 21 fixedly fitted to an inner wall surface of an axial central portion of the housing 10.

Figure 2:
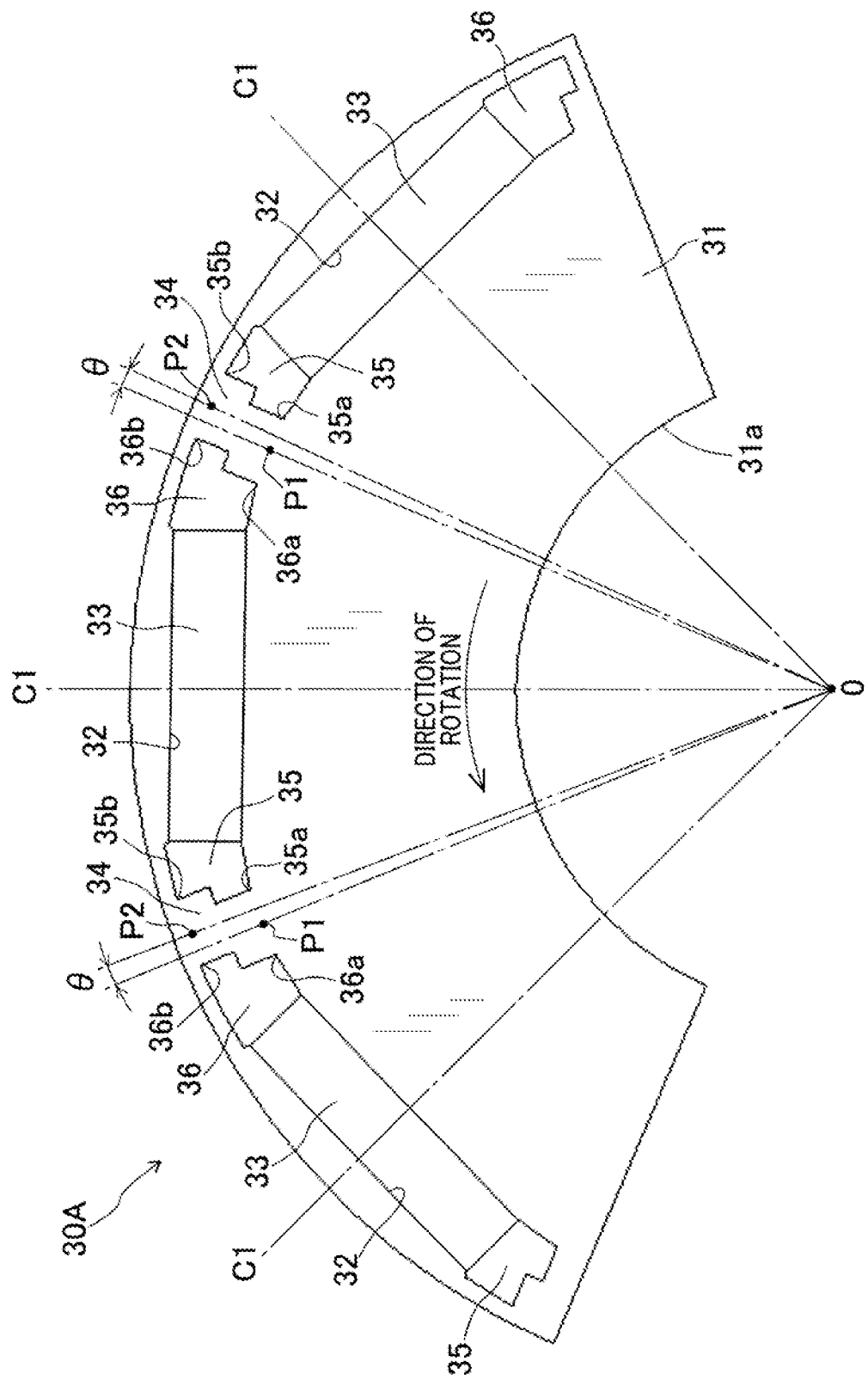
FIG. 2 is a plan view of part of the rotor according to the first embodiment, the part of the rotor including three magnetic poles.

The rotor 30A is fixed on an axial central portion of a rotating shaft 13 so as to rotate together with the rotating shaft 13. The rotating shaft 13 is rotatably supported by axial end walls of the housing 10 via a pair of bearings 11. The rotor 30A is arranged radially inside the stator 20 so as to radially face the stator 20 with a predetermined air gap formed therebetween. As shown in FIG. 2, the rotor 30A includes a rotor core 31 and a plurality of permanent magnets 33. The rotor core 31 has a plurality of magnet-receiving holes 32, a plurality of q-axis core portions 34, a plurality of first magnetic flux barrier 35 and a plurality of second magnetic flux barrier 36. The permanent magnets 33 are embedded (or received) respectively in the magnet-receiving holes 32 of the rotor core 31.

Specifically, in the present embodiment, the rotor core 31 is formed, by laminating a plurality of annular steel sheets in the axial direction, into a hollow cylindrical shape. Consequently, at the radial center of the rotor core 31, there is formed a through-hole 31a. In addition, though not shown in FIG. 2, the rotating shaft 13 is fixedly fitted in the through-hole 31a of the rotor core 31.

In a radially outer peripheral portion of the rotor core 31, there are formed the plurality (e.g., eight in the present embodiment) of magnet-receiving holes 32 each axially penetrating the rotor core 31. The magnet-receiving holes 32 are spaced from one another in the circumferential direction of the rotor core 31 at predetermined intervals. Each of the magnet-receiving holes 32 has a rectangular cross section perpendicular to the axial direction of the rotor core 31. Moreover, each of the magnet-receiving holes 32 is formed so that the longer sides of the rectangular cross section of the magnet-receiving hole 32 extend perpendicular to a radial direction of the rotor core 31.

Each of the permanent magnets 33 also has a rectangular cross section perpendicular to the axial direction of the rotor core 31 and is received in one of the magnet-receiving holes 32 of the rotor core 31; the rectangular cross section of the permanent magnet 33 substantially coincides with that of the magnet-receiving hole 32. The permanent magnets 33 are arranged in the circumferential direction of the rotor core 31 at equal intervals so as to form a plurality of magnetic poles (e.g., four north poles and four south poles in the present embodiment) on the radially outer periphery of the rotor core 31; the polarities of the magnetic poles alternate between north and south in the circumferential direction of the rotor core 31. In addition, for each of the magnetic poles, the permanent magnet 33 forming the magnetic pole as well as the magnet-receiving hole 32 having the permanent magnet 33 received therein are arranged symmetrically with respect to a centerline C1 of the magnetic pole; the centerline C1 radially extends through the rotational axis O of the rotor core 31 so as to circumferentially bisect the magnetic pole.

Each of the q-axis core portions 34 is formed between one circumferentially-adjacent pair of the magnetic poles having different polarities. Through the q-axis core portions 34, magnetic flux flows from between one circumferentially-adjacent pair of the magnetic poles to between another circumferentially-adjacent pair of the magnetic poles.

Each of the first magnetic flux barriers 35 is formed integrally with one of the magnet-receiving holes 32 so as to be continuous with the magnet-receiving hole 32 on the downstream side of the magnet-receiving hole 32 in the direction of rotation of the rotor 30A (i.e., on the left side of the magnet-receiving hole 32 in FIG. 2). That is, each of the first magnetic flux barriers 35 is formed as a magnetic void between one circumferentially-adjacent pair of the magnet-receiving holes 32 and the q-axis core portions 34.

On the other hand, each of the second magnetic flux barriers 36 is formed integrally with one of the magnet-receiving holes 32 so as to be continuous with the magnet-receiving hole 32 on the upstream side of the magnet-receiving hole 32 in the direction of rotation of the rotor 30A (i.e., on the right side of the magnet-receiving hole 32 in FIG. 2). That is, each of the second magnetic flux barriers 36 is also formed as a magnetic void between one circumferentially-adjacent pair of the magnet-receiving holes 32 and the q-axis core portions 34.

Moreover, in the present embodiment, the first magnetic flux barriers 35 have a different cross-sectional shape perpendicular to the axial direction of the rotor core 31 from the second magnetic flux barriers 36.

Specifically, each of the first magnetic flux barriers 35 is reduced in cross-sectional shape (or area) by protruding a radially outer half of a q-axis core portion 34-side (or downstream-side) wall surface of the first magnetic flux barrier 35 upstream in the direction of rotation of the rotor 30A from a radially inner half of the q-axis core portion 34-side wall surface. Consequently, for each of the first magnetic flux barriers 35, a radially outer and q-axis core portion 34-side corner 35b of the first magnetic flux barrier 35 is offset upstream (or backward) in the direction of rotation of the rotor 30A from a radially inner and q-axis core portion 34-side corner 35a of the first magnetic flux barrier 35 by a predetermined offset angle θ (in electrical angle).

On the other hand, each of the second magnetic flux barriers 36 is expanded in cross-sectional shape (or area) by recessing a radially outer half of a q-axis core portion 34-side (or upstream-side) wall surface of the second magnetic flux barrier 36 upstream in the direction of rotation of the rotor 30A from a radially inner half of the q-axis core portion 34-side wall surface. Consequently, for each of the second magnetic flux barriers 36, a radially outer and q-axis core portion 34-side corner 36b of the second magnetic flux barrier 36 is offset upstream in the direction of rotation of the rotor 30A from a radially inner and q-axis core portion 34-side corner 36a of the second magnetic flux barrier 36 by the predetermined offset angle θ.

As a result, for each of the magnetic poles, the pair of first and second magnetic flux barriers 35 and 36, which are located respectively on opposite circumferential sides of the magnet-receiving hole 32 in which the permanent magnet 33 forming the magnetic pole is received, are formed asymmetrically with respect to the centerline C1 of the magnetic pole.

Moreover, with the above asymmetric formation of the first and second magnetic flux barriers 35 and 36, for each of the q-axis core portions 34 formed between the first and second magnetic flux barriers 35 and 36, a radially outer circumferential width center P2 of the q-axis core portion 34 is offset upstream in the direction of rotation of the rotor 30A from a radially inner circumferential width center P1 of the q-axis core portion 34 by the predetermined offset angle θ. Here, the radially outer circumferential width center P2 corresponds to the center of the circumferential distance between one circumferentially-adjacent pair of the radially outer and q-axis core portion 34-side corners 35b of the first magnetic flux barriers 35 and the radially outer and q-axis core portion 34-side corners 36b of the second magnetic flux barriers 36; the radially inner circumferential width center P1 corresponds to the center of the circumferential distance between one circumferentially-adjacent pair of the radially inner and q-axis core portion 34-side corners 35a of the first magnetic flux barriers 35 and the radially inner and q-axis core portion 34-side corners 36a of the second magnetic flux barriers 36.

Consequently, for each of the magnetic poles, the pair of q-axis core portions 34 which are located respectively on opposite circumferential sides of the magnetic pole are formed asymmetrically with respect to the centerline C1 of the magnetic pole.

In addition, in the present embodiment, the predetermined offset angle θ is set to be greater than 0° and less than 6.9° in electrical angle.

Next, reduction of torque ripple in the rotating electric machine 1, which includes the rotor 30A according to the present embodiment, will be described.

In general, since electric current whose phase (or lead angle) is equal to α is applied to the magnetic force waveform of the permanent magnets 33 whose phase is equal to 0, the phase of the magnet torque becomes approximately equal to α/2.

In most cases, the motor torque (or total output torque) of an IPM motor becomes maximum in the vicinity of the reluctance torque peaks of α≈45°. However, in cases where the magnet torque is the main torque, the maximum torque occurs in the vicinity of, for example, α≈35°. Here, assuming that the synthesization of the waveform of the reluctance torque whose phase is equal to 35° (i.e., equal to α) and the waveform of the magnet torque whose phase is equal to 17.5° (i.e., equal to α/2) becomes the maximum torque, it is possible to conduct an investigation considering almost all cases.

Figure 3:
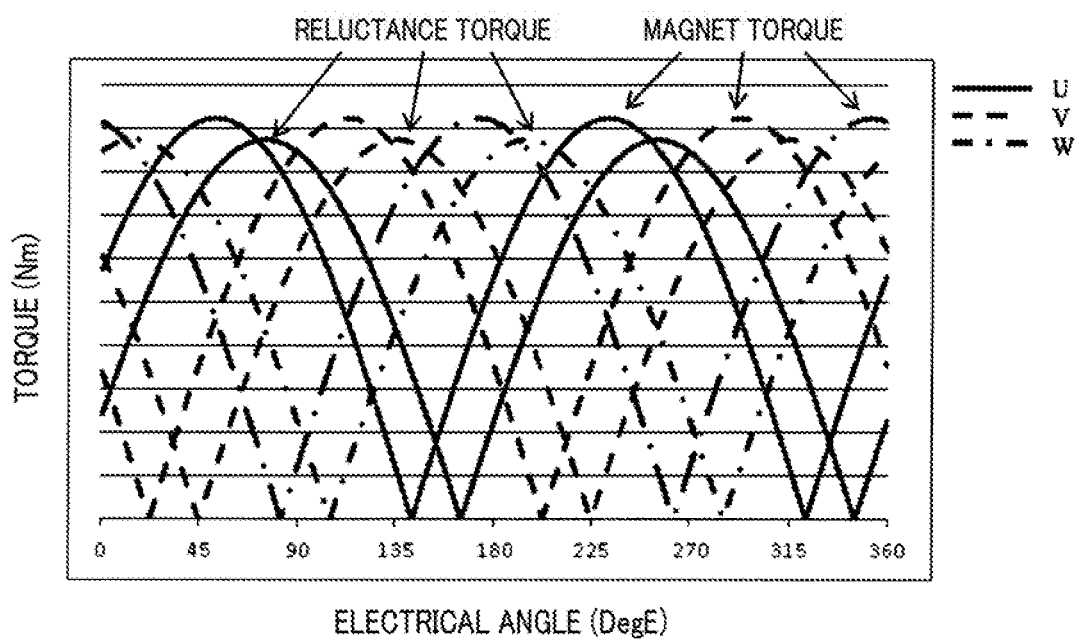
FIG. 3 is a characteristic chart illustrating the waveforms of reluctance torque and magnet torque of an IPM motor.

The actual torque ripple is complicated due to the influence of many factors, such as air gaps between teeth of the stator 20, slot multiplication and magnetic saturation. However, assuming that the electric current waveform and the torque response characteristics of the motor are all sine waves, the torque waveforms become as shown in FIG. 3. Specifically, in FIG. 3, there are shown the waveforms of the reluctance torque (whose amplitude is small) and the magnet toque (whose amplitude is large) for each phase (i.e., U-phase, V-phase and W-phase).

Figure 4:
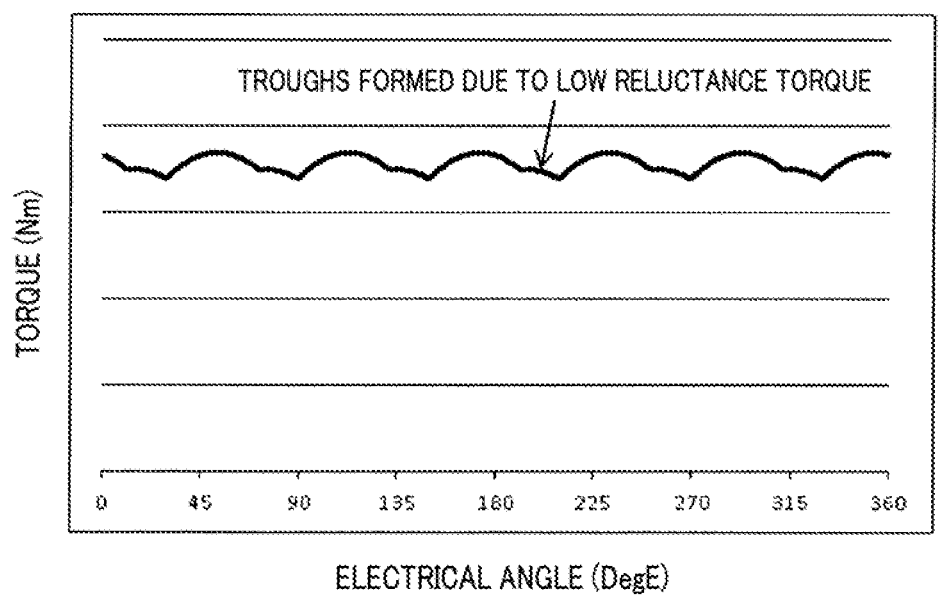
FIG. 4 is a characteristic chart illustrating the waveform of motor torque which is obtained by synthesizing the reluctance torque and the magnet torque shown in FIG. 3.

FIG. 4 shows the waveform of the motor torque which is obtained by summing the result of tracing the maximum value of the reluctance torque and the result of tracing the maximum value of the magnet torque in FIG. 3.

As shown in FIG. 4, due to the fact that the electric current phase α of the reluctance torque is 35°, not 45° at which the reluctance torque reaches its peaks, the reluctance torque is low and there are formed deep troughs at the electric current shift points of the magnet torque in the waveform of the motor torque, causing the torque ripple to become large. Accordingly, it is possible to reduce the torque ripple by shifting the phase at which the reluctance torque has its maximum value to the vicinity of 35°.

In view of the above, in the present embodiment, for each of the q-axis core portions 34 formed between one circumferentially-adjacent pair of the magnetic poles, the radially outer circumferential width center P2 of the q-axis core portion 34 is offset upstream in the direction of rotation of the rotor 30A from the radially inner circumferential width center P1 of the q-axis core portion 34 by the predetermined offset angle θ, so as to shift the phase at which the reluctance torque has its maximum value to the vicinity of 35°.

Figure 5:
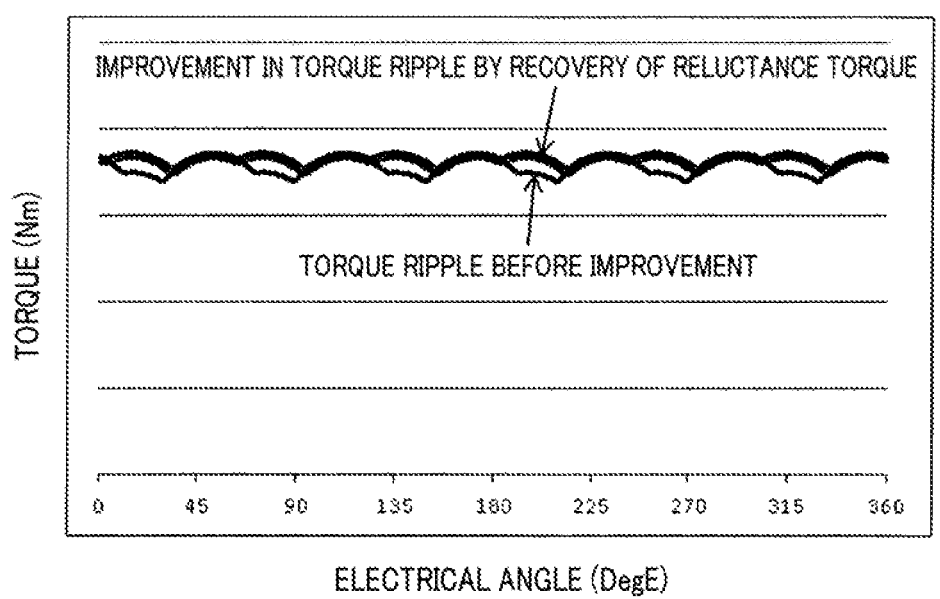
FIG. 5 is a characteristic chart illustrating both the motor torque waveforms before and after improvement according to the first embodiment.

Consequently, as shown in FIG. 5, the motor torque is improved. More specifically, compared to the motor torque before the improvement (i.e., the motor torque shown in FIG. 4), the reluctance torque is recovered, thereby reducing the torque ripple and increasing the motor torque.

The above-described rotor 30A according to the present embodiment has the following advantages.

In the present embodiment, the rotor 30A includes the hollow cylindrical rotor 31 and the permanent magnets 33. The rotor core 31 has the magnet-receiving holes 32 arranged in the circumferential direction thereof. The permanent magnets 33 are received respectively in the magnet-receiving holes 32 of the rotor core 31 to form the magnetic poles the polarities of which alternate between north and south in the circumferential direction of the rotor core 31. Moreover, the rotor core 31 has the q-axis core portions 34 each of which is located between one circumferentially-adjacent pair of the magnetic poles. For each of the q-axis core portions 34, the radially outer circumferential width center P2 of the q-axis core portion 34 is offset upstream in the direction of rotation of the rotor 30A from the radially inner circumferential width center P1 of the q-axis core portion 34.

With the above configuration, it is possible to reduce the torque ripple and increase the motor torque.

Moreover, in the present embodiment, the rotor core 31 further has the first magnetic flux barriers 35 and the second magnetic flux barriers 36. Each of the first magnetic flux barriers 35 is formed between one circumferentially-adjacent pair of the magnet-receiving holes 32 and the q-axis core portions 34 of the rotor core 31 so as to be located downstream (or forward) in the direction of rotation of the rotor 30A from the magnet-receiving hole 32 of the pair. Each of the second magnetic flux barriers 36 is formed between one circumferentially-adjacent pair of the magnet-receiving holes 32 and the q-axis core portions 34 of the rotor core 31 so as to be located upstream in the direction of rotation of the rotor 30A from the magnet-receiving hole 32 of the pair. For each of the first magnetic flux barriers 35, the radially outer and q-axis core portion 34-side corner 35b of the first magnetic flux barrier 35 is offset upstream in the direction of rotation of the rotor 30A from the radially inner and q-axis core portion 34-side corner 35a of the first magnetic flux barrier 35. For each of the second magnetic flux barriers 36, the radially outer and q-axis core portion 34-side corner 36b of the second magnetic flux barrier 36 is offset upstream in the direction of rotation of the rotor 30A from the radially inner and q-axis core portion 34-side corner 36a of the second magnetic flux barrier 36.

With the above configuration, it is possible to simply and reliably form each of the q-axis core portions 34 between one circumferentially-adjacent pair of the first and second magnetic flux barriers 35 and 36 such that the radially outer circumferential width center P2 of the q-axis core portion 34 is offset upstream in the direction of rotation of the rotor 30A from the radially inner circumferential width center P1 of the q-axis core portion 34.

In the present embodiment, for each of the magnetic poles, the pair of q-axis core portions 34 which are located respectively on opposite circumferential sides of the magnetic pole are formed asymmetrically with respect to the centerline C1 of the magnetic pole. Moreover, for each of the magnetic poles, the pair of first and second magnetic flux barriers 35 and 36, which are located respectively on opposite circumferential sides of the magnet-receiving hole 32 in which the permanent magnet 33 forming the magnetic pole is received, are formed asymmetrically with respect to the centerline C1 of the magnetic pole.

With the above configuration, it is possible to simply and reliably form each of the q-axis core portions 34 between one circumferentially-adjacent pair of the first and second magnetic flux barriers 35 and 36 such that the radially outer circumferential width center P2 of the q-axis core portion 34 is offset upstream in the direction of rotation of the rotor 30A from the radially inner circumferential width center P1 of the q-axis core portion 34.

Second Embodiment

Figure 6:
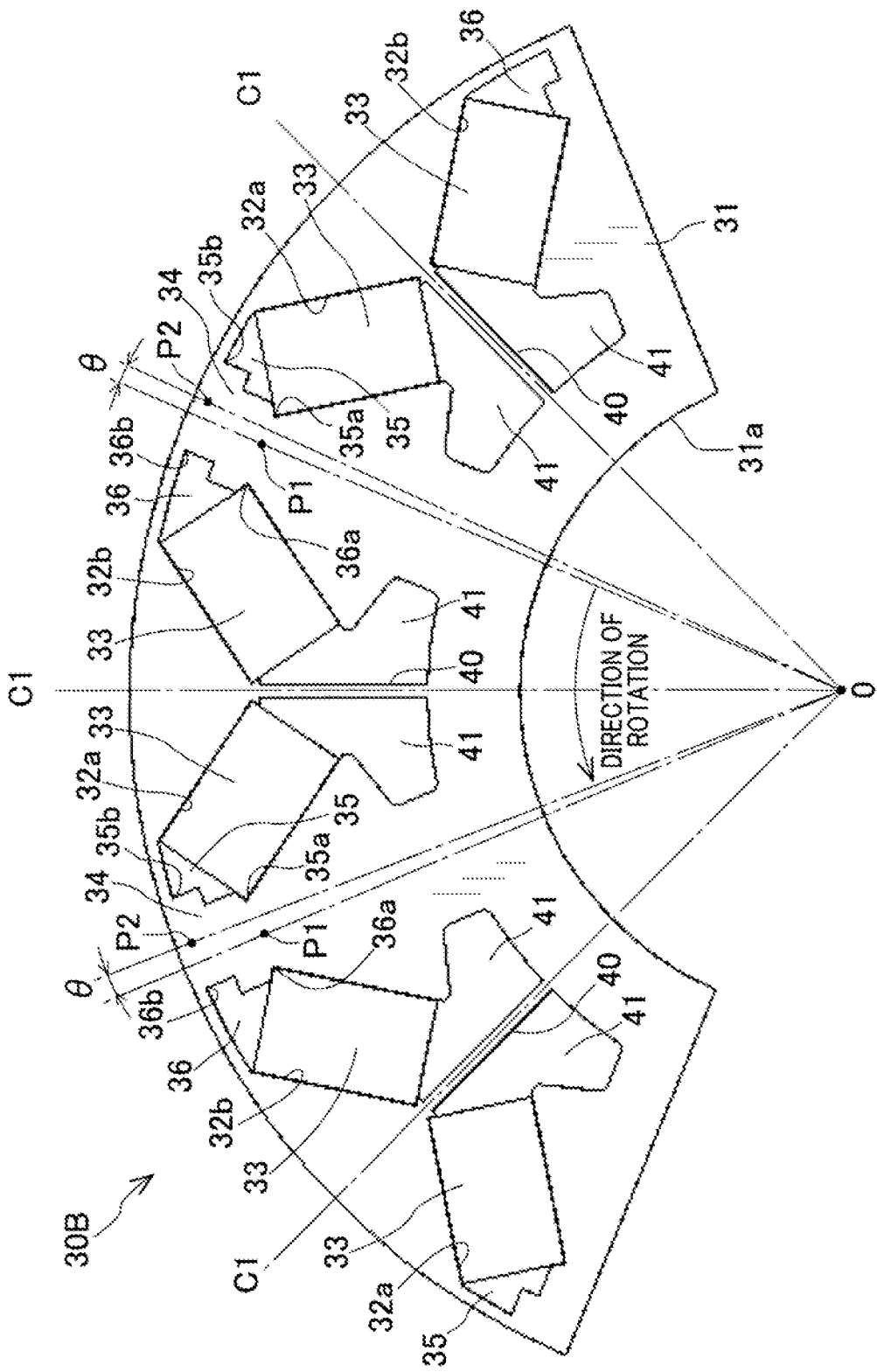
FIG. 6 is a plan view of part of a rotor according to a second embodiment, the part of the rotor including three magnetic poles.

FIG. 6 shows the configuration of a rotor 30B according to a second embodiment. The rotor 30B is also for use in the rotating electric machine 1 described in the first embodiment.

As shown in FIG. 6, the rotor 30B includes a rotor core 31 and a plurality of permanent magnets 33. The rotor core 31 has a plurality of pairs of magnet-receiving holes 32a and 32b, a plurality of q-axis core portions 34, a plurality of first magnetic flux barrier 35 and a plurality of second magnetic flux barrier 36. The permanent magnets 33 are embedded (or received) respectively in the magnet-receiving holes 32a and 32b of the rotor core 31.

As in the first embodiment, the rotor core 31 is formed, by laminating a plurality of annular steel sheets in the axial direction, into a hollow cylindrical shape. Consequently, at the radial center of the rotor core 31, there is formed a through-hole 31a. In addition, though not shown in FIG. 6, the rotating shaft 13 is fixedly fitted in the through-hole 31a of the rotor core 31.

In a radially outer peripheral portion of the rotor core 31, there are formed the plurality (e.g., eight in the present embodiment) of pairs of magnet-receiving holes 32a and 32b each axially penetrating the rotor core 31. The pairs of magnet-receiving holes 32a and 32b are spaced from one another in the circumferential direction of the rotor core 31 at predetermined intervals. Further, each pair of the magnet-receiving holes 32a and 32b is formed in a substantially V-shape that opens toward a radially outer periphery of the rotor core 31 (i.e., toward the stator 20 side).

For each pair of the magnet-receiving holes 32a and 32b, there is formed in the rotor core 31 a corresponding center bridge 40 that radially extends between the pair of magnet-receiving holes 32a and 32b. The corresponding center bridge 40 is provided for causing magnetic flux saturation and thereby impeding formation of a magnetic circuit between the pair of magnet-receiving holes 32a and 32b. In addition, the corresponding center bridge 40 has a substantially constant width over its entire radial length.

Each of the permanent magnets 33 has a rectangular cross section perpendicular to the axial direction of the rotor core 31 and is received in one of the magnet-receiving holes 32a and 32b of the rotor core 31.

In the present embodiment, for each pair of the magnet-receiving holes 32a and 32b of the rotor core 31, the pair of permanent magnets 33 which are received respectively in the pair of magnet-receiving holes 32a and 32b are arranged so as to together form one magnetic pole. Accordingly, in the rotor 30B, there are formed a total of eight magnetic poles (i.e., four north poles and four south poles) on the radially outer periphery of the rotor core 31; the polarities of the magnetic poles alternate between north and south in the circumferential direction of the rotor core 31.

Moreover, each of the permanent magnets 33 is positioned in the respective one of the magnet-receiving holes 32a and 32b of the rotor core 31 with a corner between a radially outer-side surface and a magnetic pole center-side surface of the permanent magnet 33 abutting a radially outer-side root portion of the corresponding center bridge 40.

In addition, for each of the magnetic poles, the pair of permanent magnets 33 forming the magnetic pole as well as the pair of magnet-receiving holes 32a and 32b having the pair of permanent magnets 33 received therein are arranged symmetrically with respect to a centerline C1 of the magnetic pole; the centerline C1 radially extends through the rotational axis O of the rotor core 31 so as to circumferentially bisect the magnetic pole.

Each of the q-axis core portions 34 is formed between one circumferentially-adjacent pair of the magnetic poles having different polarities. Through the q-axis core portions 34, magnetic flux flows from between one circumferentially-adjacent pair of the magnetic poles to between another circumferentially-adjacent pair of the magnetic poles.

Each of the first magnetic flux barriers 35 is formed integrally with one of the magnet-receiving holes 32a so as to be continuous with the magnet-receiving hole 32a on the downstream side of the magnet-receiving hole 32a in the direction of rotation of the rotor 30B (i.e., on the left side of the magnet-receiving hole 32a in FIG. 6). That is, each of the first magnetic flux barriers 35 is formed as a magnetic void between one circumferentially-adjacent pair of the magnet-receiving holes 32a and the q-axis core portions 34.

On the other hand, each of the second magnetic flux barriers 36 is formed integrally with one of the magnet-receiving holes 32b so as to be continuous with the magnet-receiving hole 32b on the upstream side of the magnet-receiving hole 32b in the direction of rotation of the rotor 30B (i.e., on the right side of the magnet-receiving hole 32b in FIG. 6). That is, each of the second magnetic flux barriers 36 is formed as a magnetic void between one circumferentially-adjacent pair of the magnet-receiving holes 32b and the q-axis core portions 34.

Moreover, in the present embodiment, the first magnetic flux barriers 35 have a different cross-sectional shape perpendicular to the axial direction of the rotor core 31 from the second magnetic flux barriers 36.

Specifically, each of the first magnetic flux barriers 35 is reduced in cross-sectional shape (or area) by protruding a radially outer half of a q-axis core portion 34-side (or downstream-side) wall surface of the first magnetic flux barrier 35 upstream in the direction of rotation of the rotor 30B from a radially inner half of the q-axis core portion 34-side wall surface. Consequently, for each of the first magnetic flux barriers 35, a radially outer and q-axis core portion 34-side corner 35b of the first magnetic flux barrier 35 is offset upstream in the direction of rotation of the rotor 30B from a radially inner and q-axis core portion 34-side corner 35a of the first magnetic flux barrier 35 by a predetermined offset angle θ (in electrical angle).

On the other hand, each of the second magnetic flux barriers 36 is expanded in cross-sectional shape (or area) by recessing a radially outer half of a q-axis core portion 34-side (or upstream-side) wall surface of the second magnetic flux barrier 36 upstream in the direction of rotation of the rotor 30B from a radially inner half of the q-axis core portion 34-side wall surface. Consequently, for each of the second magnetic flux barriers 36, a radially outer and q-axis core portion 34-side corner 36b of the second magnetic flux barrier 36 is offset upstream in the direction of rotation of the rotor 30B from a radially inner and q-axis core portion 34-side corner 36a of the second magnetic flux barrier 36 by the predetermined offset angle θ.

As a result, for each of the magnetic poles, the pair of first and second magnetic flux barriers 35 and 36, which are located respectively on opposite circumferential sides of the pair of magnet-receiving holes 32a and 32b in which the pair of permanent magnets 33 forming the magnetic pole are respectively received, are formed asymmetrically with respect to the centerline C1 of the magnetic pole.

Moreover, with the above asymmetric formation of the first and second magnetic flux barriers 35 and 36, for each of the q-axis core portions 34 formed between the first and second magnetic flux barriers 35 and 36, a radially outer circumferential width center P2 of the q-axis core portion 34 is offset upstream in the direction of rotation of the rotor 30B from a radially inner circumferential width center P1 of the q-axis core portion 34 by the predetermined offset angle θ. Here, the radially outer circumferential width center P2 corresponds to the center of the circumferential distance between one circumferentially-adjacent pair of the radially outer and q-axis core portion 34-side corners 35b of the first magnetic flux barriers 35 and the radially outer and q-axis core portion 34-side corners 36b of the second magnetic flux barriers 36; the radially inner circumferential width center P1 corresponds to the center of the circumferential distance between one circumferentially-adjacent pair of the radially inner and q-axis core portion 34-side corners 35a of the first magnetic flux barriers 35 and the radially inner and q-axis core portion 34-side corners 36a of the second magnetic flux barriers 36.

Consequently, for each of the magnetic poles, the pair of q-axis core portions 34 which are located respectively on opposite circumferential sides of the magnetic pole are formed asymmetrically with respect to the centerline C1 of the magnetic pole.

In addition, in the present embodiment, the predetermined offset angle θ is set to be greater than 0° and less than 6.9° in electrical angle.

Moreover, for each pair of the magnet-receiving holes 32a and 32b, there are formed in the rotor core 31 one pair of third magnetic flux barriers 41 so as to extend respectively from the magnetic pole center-side ends of the pair of magnet-receiving holes 32a and 32b radially inward (i.e., toward the rotational axis O of the rotor core 31). Furthermore, between the pair of third magnetic flux barriers 41, the corresponding center bridge 40 formed between the pair of magnet-receiving holes 32a and 32b extends radially inward so as to separate the pair of third magnetic flux barriers 41 from each other. In addition, the pair of third magnetic flux barriers 41 extend on the radially inside (i.e., on the rotational axis O side) of an imaginary line segment that connects those corners of the permanent magnets 33 received respectively in the pair of magnet-receiving holes 32a and 32b which are closest to the rotational axis O of the rotor core 31.

The above-described rotor 30B according to the present embodiment has the following advantages.

In the present embodiment, the rotor 30B includes the hollow cylindrical rotor core 31 and the pairs of permanent magnets 33. The rotor core 31 has the pairs of magnet-receiving holes 32a and 32b arranged in the circumferential direction thereof. Each pair of the magnet-receiving holes 32a and 32b is formed in the substantially V-shape that opens toward the radially outer periphery of the rotor core 31. Each pair of the permanent magnets 33 is received in one of the substantially V-shaped pairs of the magnet-receiving holes 32a and 32b of the rotor core 31 to form one magnetic pole. Moreover, the rotor core 31 has the q-axis core portions 34 each of which is located between one circumferentially-adjacent pair of the magnetic poles. For each of the q-axis core portions 34, the radially outer circumferential width center P2 of the q-axis core portion 34 is offset upstream in the direction of rotation of the rotor 30B from the radially inner circumferential width center P1 of the q-axis core portion 34.

With the above configuration, it is possible to reduce the torque ripple and increase the motor torque.

Moreover, in the present embodiment, the rotor core 31 further has the first magnetic flux barriers 35 and the second magnetic flux barriers 36. Each of the first magnetic flux barriers 35 is formed between one circumferentially-adjacent pair of the magnet-receiving holes 32a and the q-axis core portions 34 of the rotor core 31 so as to be located downstream in the direction of rotation of the rotor 30B from the magnet-receiving hole 32a of the pair. Each of the second magnetic flux barriers 36 is formed between one circumferentially-adjacent pair of the magnet-receiving holes 32b and the q-axis core portions 34 of the rotor core 31 so as to be located upstream in the direction of rotation of the rotor 30B from the magnet-receiving hole 32b of the pair. For each of the first magnetic flux barriers 35, the radially outer and q-axis core portion 34-side corner 35b of the first magnetic flux barrier 35 is offset upstream in the direction of rotation of the rotor 30B from the radially inner and q-axis core portion 34-side corner 35a of the first magnetic flux barrier 35. For each of the second magnetic flux barriers 36, the radially outer and q-axis core portion 34-side corner 36b of the second magnetic flux barrier 36 is offset upstream in the direction of rotation of the rotor 30B from the radially inner and q-axis core portion 34-side corner 36a of the second magnetic flux barrier 36.

With the above configuration, it is possible to simply and reliably form each of the q-axis core portions 34 between one circumferentially-adjacent pair of the first and second magnetic flux barriers 35 and 36 such that the radially outer circumferential width center P2 of the q-axis core portion 34 is offset upstream in the direction of rotation of the rotor 30A from the radially inner circumferential width center P1 of the q-axis core portion 34.

In the present embodiment, for each of the magnetic poles, the pair of q-axis core portions 34 which are located respectively on opposite circumferential sides of the magnetic pole are formed asymmetrically with respect to the centerline C1 of the magnetic pole. Moreover, for each of the magnetic poles, the pair of first and second magnetic flux barriers 35 and 36, which are located respectively on opposite circumferential sides of the pair of magnet-receiving holes 32a and 32b in which the pair of permanent magnets 33 forming the magnetic pole is received, are formed asymmetrically with respect to the centerline C1 of the magnetic pole.

With the above configuration, it is possible to simply and reliably form each of the q-axis core portions 34 between one circumferentially-adjacent pair of the first and second magnetic flux barriers 35 and 36 such that the radially outer circumferential width center P2 of the q-axis core portion 34 is offset upstream in the direction of rotation of the rotor 30B from the radially inner circumferential width center P1 of the q-axis core portion 34.

The inventor of the present invention has investigated the relationship between the offset angle θ (in electrical angle) and torque ripple in the rotor 30B according to the present embodiment.

Figure 7:
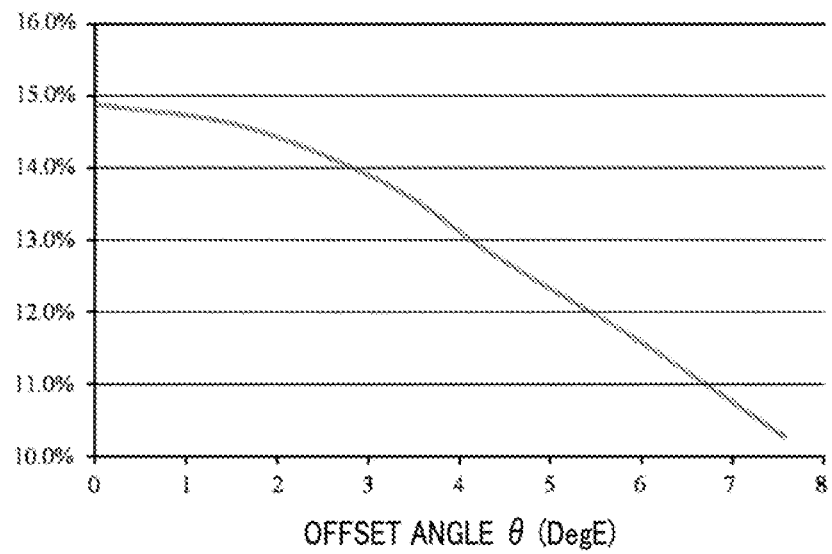
FIG. 7 is a characteristic chart illustrating the relationship between an offset angle $\theta$ and torque ripple in the rotor according to the second embodiment.

FIG. 7 shows the investigation results. As can be seen from FIG. 7, the torque ripple had a maximum value of about 14.8% when the offset angle θ was 0°. Moreover, with increase in the offset angle θ from 0°, the torque ripple gradually decreased. Consequently, when the offset angle θ was increased above 6.9° in electrical angle, the torque ripple decreased bellow 11.0%.

Moreover, the inventor has also investigated the relationship between the offset angle θ (in electrical angle) and the motor torque (or the total output torque of the rotating electric machine 1).

Figure 8:
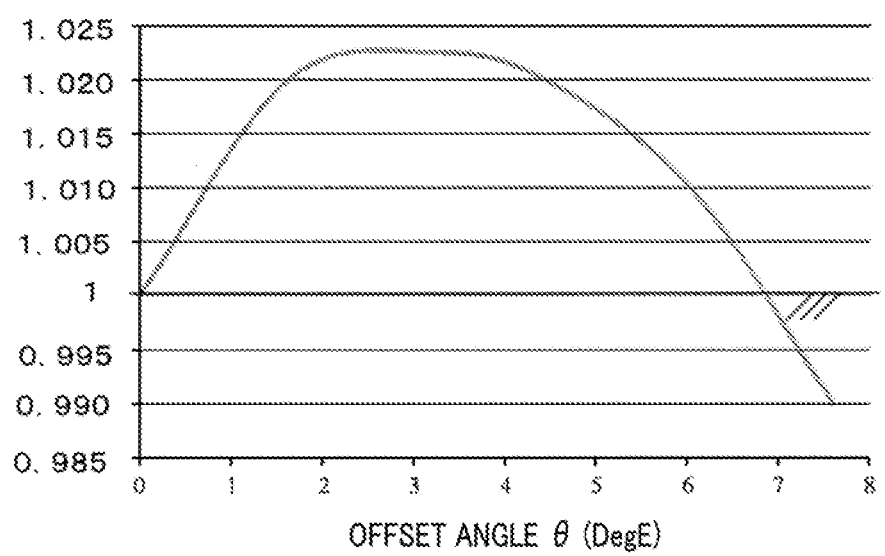
FIG. 8 is a characteristic chart illustrating the relationship between the offset angle $\theta$ and relative torque in the rotor according to the second embodiment.

FIG. 8 shows the investigation results, where the motor torque is shown as relative torque to the conventional motor torque obtained with the offset angle θ being 0°. As can be seen from FIG. 8, when the offset angle θ was greater than 0° and less than 6.9° (i.e., 0°≤θ≤6.9°) in electrical angle, the motor torque was higher than the conventional motor torque. In particular, when the offset angle θ was not less than 2° and not greater than 4° (i.e., 2°≤θ≤4°) in electrical angle, the motor torque was considerably higher than the conventional motor torque.

Accordingly, from the above investigation results shown in FIGS. 7 and 8, it has been made clear that setting the offset angle θ to be greater than 0° and less than 6.9° in electrical angle, it is possible to reduce the torque ripple while increasing the motor torque. That is to say, it is preferable to set the offset angle θ to be greater than 0° and less than 6.9° in electrical angle. Moreover, it also has been made clear that setting the offset angle θ to be not less than 2° and not greater than 4° in electrical angle, it is possible to considerably increase the motor torque while reducing the torque ripple. That is to say, it is more preferable to set the offset angle θ to be not less than 2° and not greater than 4° in electrical angle.

Third Embodiment

Figure 9:
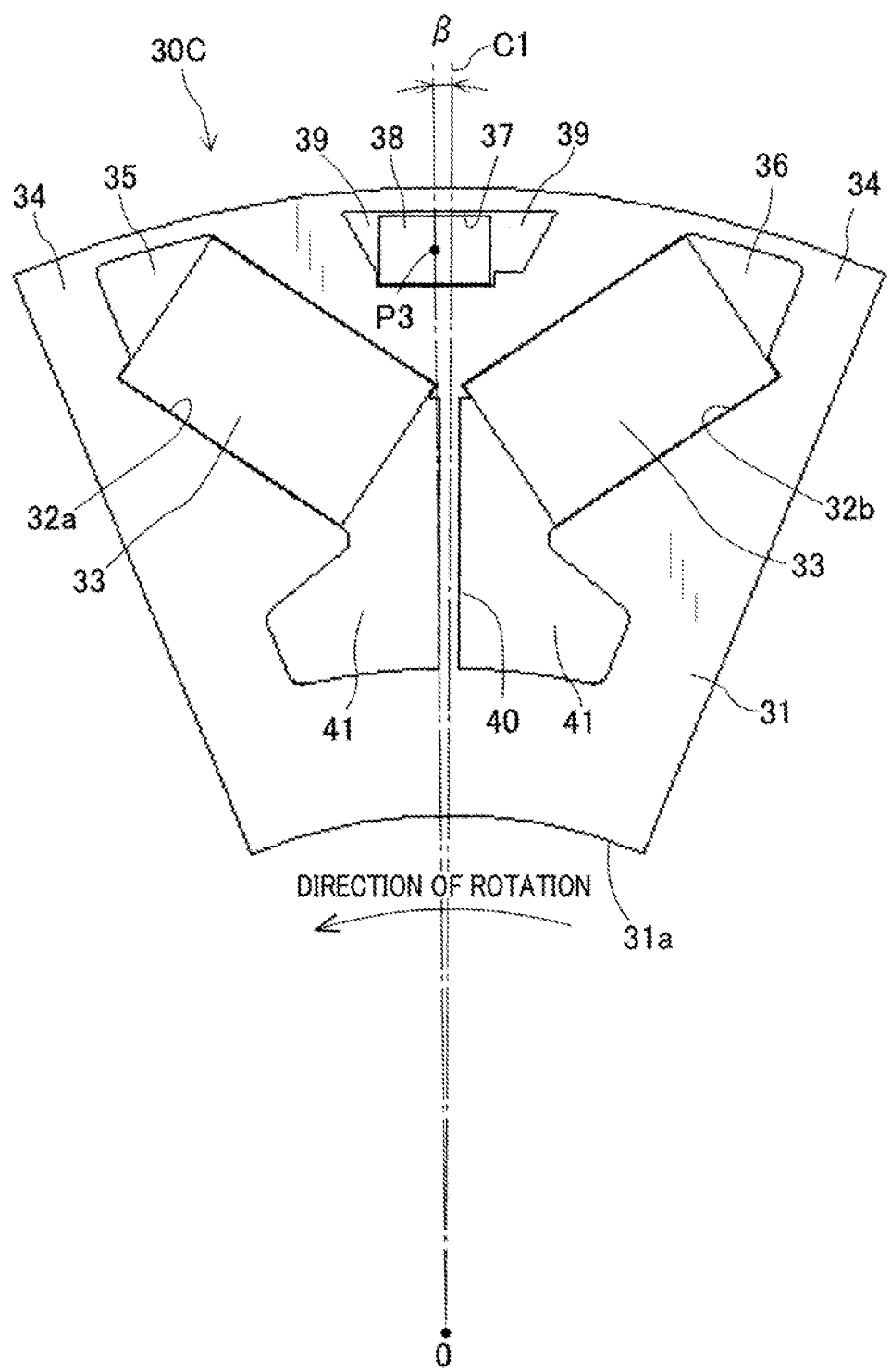
FIG. 9 is a plan view of part of a rotor according to a third embodiment, the part of the rotor constituting one magnetic pole.

FIG. 9 shows the configuration of a rotor 30C according to a third embodiment. The rotor 30C is also for use in the rotating electric machine 1 described in the first embodiment.

As shown in FIG. 9, the rotor 30C includes a rotor core 31, a plurality of permanent magnets 33 and a plurality of center magnets 38. The rotor core 31 has a plurality of pairs of magnet-receiving holes 32a and 32b, a plurality of q-axis core portions 34, a plurality of first magnetic flux barrier 35, a plurality of second magnetic flux barrier 36 and a plurality of center magnet-receiving holes 37. The permanent magnets 33 are embedded (or received) respectively in the magnet-receiving holes 32a and 32b of the rotor core 31. The center magnets 38 are embedded (or received) respectively in the center magnet-receiving holes 37 of the rotor core 31.

As in the first embodiment, the rotor core 31 is formed, by laminating a plurality of annular steel sheets in the axial direction, into a hollow cylindrical shape. Consequently, at the radial center of the rotor core 31, there is formed a through-hole 31a. In addition, though not shown in FIG. 9, the rotating shaft 13 is fixedly fitted in the through-hole 31a of the rotor core 31.

Moreover, as in the second embodiment, in a radially outer peripheral portion of the rotor core 31, there are formed the plurality (e.g., eight in the present embodiment) of pairs of magnet-receiving holes 32a and 32b each axially penetrating the rotor core 31. The pairs of magnet-receiving holes 32a and 32b are spaced from one another in the circumferential direction of the rotor core 31 at predetermined intervals. Further, each pair of the magnet-receiving holes 32a and 32b is formed in a substantially V-shape that opens toward a radially outer periphery of the rotor core 31 (i.e., toward the stator 20 side).

Furthermore, as in the second embodiment, for each pair of the magnet-receiving holes 32a and 32b, there is formed in the rotor core 31 a corresponding center bridge 40 that radially extends between the pair of magnet-receiving holes 32a and 32b. The corresponding center bridge 40 is provided for causing magnetic flux saturation and thereby impeding formation of a magnetic circuit between the pair of magnet-receiving holes 32a and 32b. Moreover, for each pair of the magnet-receiving holes 32a and 32b, there are formed in the rotor core 31 one pair of third magnetic flux barriers 41 so as to extend respectively from the magnetic pole center-side ends of the pair of magnet-receiving holes 32a and 32b radially inward (i.e., toward the rotational axis O of the rotor core 31). In addition, between the pair of third magnetic flux barriers 41, the corresponding center bridge 40 formed between the pair of magnet-receiving holes 32a and 32b extends radially inward so as to separate the pair of third magnetic flux barriers 41 from each other.

As in the second embodiment, each of the permanent magnets 33 has a rectangular cross section perpendicular to the axial direction of the rotor core 31 and is received in one of the magnet-receiving holes 32a and 32b of the rotor core 31. For each pair of the magnet-receiving holes 32a and 32b of the rotor core 31, the pair of permanent magnets 33 which are received respectively in the pair of magnet-receiving holes 32a and 32b are arranged so as to together form one magnetic pole. Accordingly, in the rotor 30C, there are formed a total of eight magnetic poles (i.e., four north poles and four south poles) on the radially outer periphery of the rotor core 31; the polarities of the magnetic poles alternate between north and south in the circumferential direction of the rotor core 31. In addition, for each of the magnetic poles, the pair of permanent magnets 33 forming the magnetic pole as well as the pair of magnet-receiving holes 32a and 32b having the pair of permanent magnets 33 received therein are arranged symmetrically with respect to a centerline C1 of the magnetic pole; the centerline C1 radially extends through the rotational axis O of the rotor core 31 so as to circumferentially bisect the magnetic pole.

As in the second embodiment, each of the q-axis core portions 34 is formed between one circumferentially-adjacent pair of the magnetic poles having different polarities. However, unlike in the second embodiment, each of the q-axis core portions 34 radially extends straight at a substantially constant circumferential width in the present embodiment. That is, in the present embodiment, for each of the q-axis core portions 34, the radially outer circumferential width center P2 of the q-axis core portion 34 is not offset in the direction of rotation of the rotor 30C from the radially inner circumferential width center P1 of the q-axis core portion 34.

Consequently, in the present embodiment, for each of the magnetic poles, the pair of q-axis core portions 34 which are located respectively on opposite circumferential sides of the magnetic pole are formed symmetrically with respect to the centerline C1 of the magnetic pole. Moreover, for each of the magnetic poles, the pair of first and second magnetic flux barriers 35 and 36, which are located respectively on opposite circumferential sides of the pair of magnet-receiving holes 32a and 32b in which the pair of permanent magnets 33 forming the magnetic pole are respectively received, are also formed symmetrically with respect to the centerline C1 of the magnetic pole.

Each of the center magnet-receiving holes 37 is formed in the radially outer peripheral portion of the rotor core 31 so as to be circumferentially centered between one of the pairs of magnet-receiving holes 32a and 32b.

Each of the center magnets 38 has a rectangular cross section perpendicular to the axial direction of the rotor core 31. The center magnets 38 are considerably smaller in size than the permanent magnets 33 received in the magnet-receiving holes 32a and 32b of the rotor core 31.

Moreover, in the present embodiment, as shown in FIG. 9, each of the center magnets 38 is received in one of the center magnet-receiving holes 37 of the rotor core 31 so that the center P3 of the center magnet 38 is offset downstream in the direction of rotation of the rotor 30C (i.e., offset to the left side in FIG. 9) from the centerline C1 of the magnetic pole that is formed by the pair of permanent magnets 33 located respectively on opposite circumferential sides of the center magnet 38.

Figure 10:
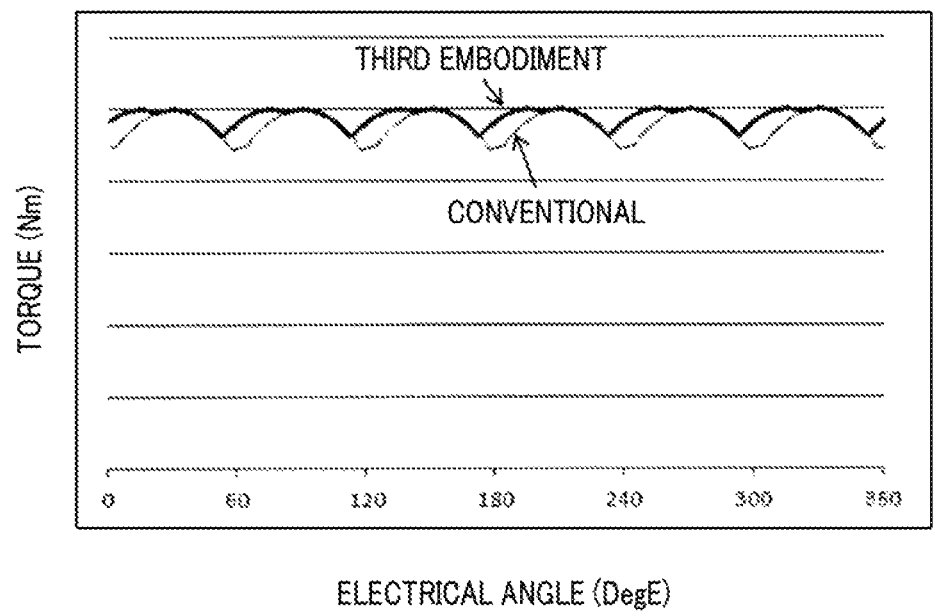
FIG. 10 is a characteristic chart illustrating both the motor torque waveforms before and after improvement according to the third embodiment.

That is, in the present embodiment, each of the center magnets 38 is arranged so that the center P3 of the center magnet 38 is offset from the centerline C1 of the magnetic pole to the downstream side in the direction of rotation of the rotor 30C where reluctance torque becomes high (i.e., to the side where electric current lead angle α becomes equal to 45°). Consequently, as shown in FIG. 10, it becomes possible to increase reluctance torque, thereby reducing torque ripple.

More particularly, in the present embodiment, for each of the center magnets 38, the center P3 of the center magnet 38 is offset downstream in the direction of rotation of the rotor 30C from the centerline C1 of the magnetic pole by a predetermined offset angle f that is set to be less than 6.9° in electrical angle.

In addition, the rotor 30C according to the present embodiment is configured so that in the motor torque (or the total output torque of the rotating electric machine 1), the percentage of reluctance torque is higher than the percentage of magnet torque.

The above-described rotor 30C according to the present embodiment has the following advantages.

In the present embodiment, the rotor 30C includes the hollow cylindrical rotor core 31 and the pairs of permanent magnets 33. The rotor core 31 has the pairs of magnet-receiving holes 32a and 32b arranged in the circumferential direction thereof. Each pair of the magnet-receiving holes 32a and 32b is formed in the substantially V-shape that opens toward the radially outer periphery of the rotor core 31. Each pair of the permanent magnets 33 is received in one of the substantially V-shaped pairs of magnet-receiving holes 32a and 32b of the rotor core 31 to form one magnetic pole. The rotor 30C is configured so that in the motor torque, the percentage of reluctance torque is higher than the percentage of magnet torque. The rotor core 31 further has the center magnet-receiving holes 37, each of which is formed in the radially outer peripheral portion of the rotor core 31 so as to be circumferentially centered between one of the substantially V-shaped pairs of magnet-receiving holes 32a and 32b. The rotor 30C further includes a plurality of center magnets 38. Each of the center magnets 38 is received in one of the center magnet-receiving holes 37 of the rotor core 31 so that the center P3 of the center magnet 38 is offset downstream in the direction of rotation of the rotor 30C from the centerline C1 of the magnetic pole that is formed by the pair of permanent magnets 33 located respectively on opposite circumferential sides of the center magnet 38.

With the above configuration, it is possible to increase reluctance torque, thereby reducing torque ripple. Moreover, with the center magnets 38 employed in addition to the permanent magnets 33, it is also possible to increase magnet torque. That is to say, it is possible to reduce the torque ripple and increase the motor torque (i.e., the total output torque of the rotating electric machine 1).

The inventor of the present invention has investigated the relationship between the offset angle β (in electrical angle) and torque ripple in the rotor 30C according to the present embodiment.

Figure 11:
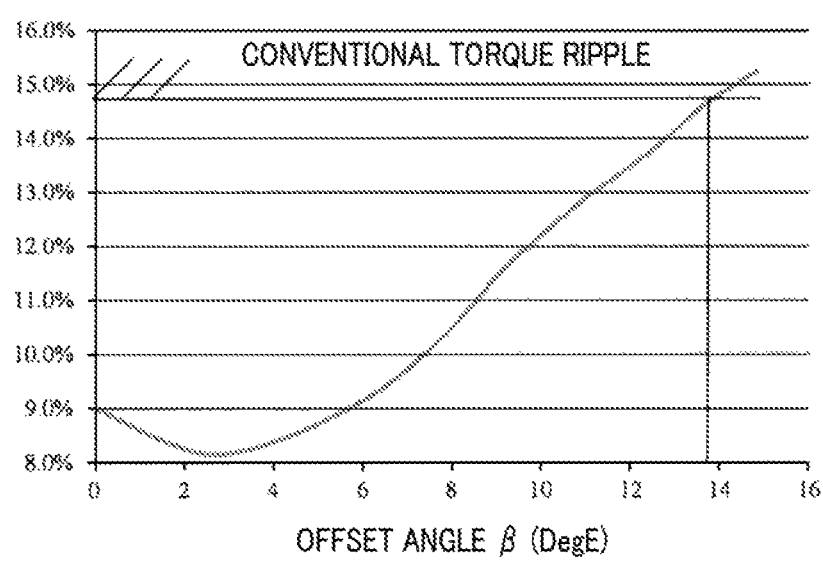
FIG. 11 is a characteristic chart illustrating the relationship between an offset angle $\beta$ and torque ripple in the rotor according to the third embodiment.

FIG. 11 shows the investigation results. As can be seen from FIG. 11, when the offset angle β was less than 6.9° in electrical angle, the torque ripple was considerably reduced in comparison with the conventional torque ripple (i.e., the torque ripple in a rotating electric machine including a conventional rotor) that is about 14.6% or more.

In addition, in FIG. 11, the torque ripple was determined by the following equation: (Tmax−Tmin)/Tave, where Tmax is the maximum value of the motor torque, Tmin is the minim value of the motor torque and Tave is an average value (e.g., root-mean-square value) of the motor torque.

Accordingly, from the above investigation results shown in FIG. 11, it has been made clear that setting the offset angle β to be less than 6.9° in electrical angle, it is possible to effectively reduce the torque ripple. That is to say, it is preferable to set the offset angle β to be less than 6.9° in electrical angle.

Fourth Embodiment

Figure 12:
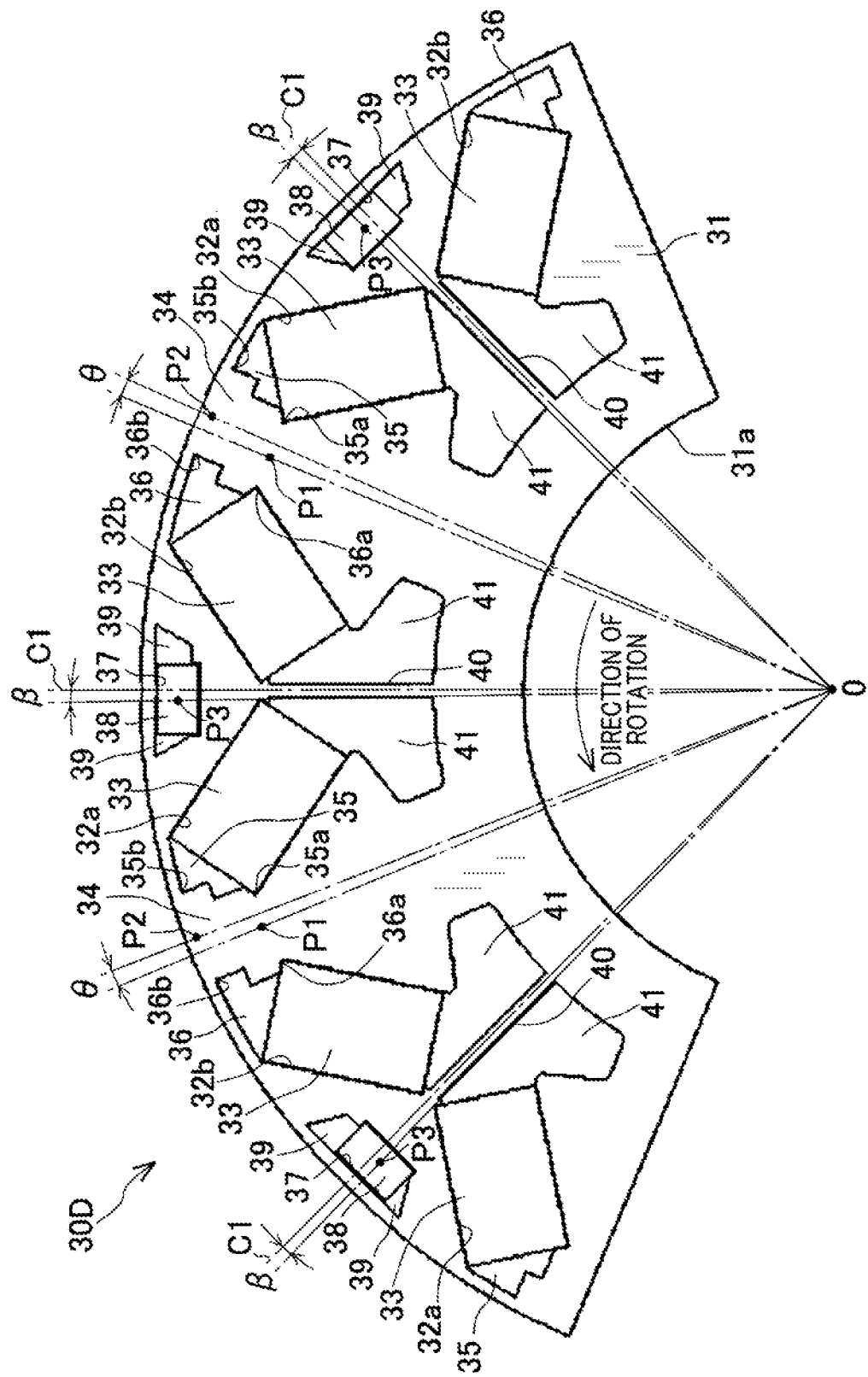
FIG. 12 is a plan view of part of a rotor according to a fourth embodiment, the part of the rotor including three magnetic poles.

FIG. 12 shows the configuration of a rotor 30D according to a fourth embodiment. The rotor 30D is a combination of the rotor 30B according to the second embodiment (see FIG. 6) and the rotor 30C according to the third embodiment (see FIG. 9).

Specifically, the rotor 30D according to the present embodiment differs from the rotor 30C according to the third embodiment only in that for each of the q-axis core portions 34 of the rotor core 31, the radially outer circumferential width center P2 of the q-axis core portion 34 is offset upstream in the direction of rotation of the rotor 30D from the radially inner circumferential width center P1 of the q-axis core portion 34. Therefore, the difference of the rotor 30D from the rotor 30C will be mainly described hereinafter.

As shown in FIG. 12, in the rotor 30D according to the present embodiment, each of the q-axis core portions 34 is formed between one circumferentially-adjacent pair of the magnetic poles having different polarities.

Moreover, as in the second embodiment, each of the first magnetic flux barriers 35 is formed integrally with one of the magnet-receiving holes 32a so as to be continuous with the magnet-receiving hole 32a on the downstream side of the magnet-receiving hole 32a in the direction of rotation of the rotor 30D (i.e., on the left side of the magnet-receiving hole 32a in FIG. 12). That is, each of the first magnetic flux barriers 35 is formed as a magnetic void between one circumferentially-adjacent pair of the magnet-receiving holes 32a and the q-axis core portions 34.

On the other hand, each of the second magnetic flux barriers 36 is formed integrally with one of the magnet-receiving holes 32b so as to be continuous with the magnet-receiving hole 32b on the upstream side of the magnet-receiving hole 32b in the direction of rotation of the rotor 30D (i.e., on the right side of the magnet-receiving hole 32b in FIG. 12). That is, each of the second magnetic flux barriers 36 is formed as a magnetic void between one circumferentially-adjacent pair of the magnet-receiving holes 32b and the q-axis core portions 34.

Moreover, as in the second embodiment, the first magnetic flux barriers 35 have a different cross-sectional shape perpendicular to the axial direction of the rotor core 31 from the second magnetic flux barriers 36.

Specifically, each of the first magnetic flux barriers 35 is reduced in cross-sectional shape (or area) by protruding a radially outer half of a q-axis core portion 34-side (or downstream-side) wall surface of the first magnetic flux barrier 35 upstream in the direction of rotation of the rotor 30D from a radially inner half of the q-axis core portion 34-side wall surface. Consequently, for each of the first magnetic flux barriers 35, a radially outer and q-axis core portion 34-side corner 35b of the first magnetic flux barrier 35 is offset upstream in the direction of rotation of the rotor 30D from a radially inner and q-axis core portion 34-side corner 35a of the first magnetic flux barrier 35 by a predetermined offset angle θ (in electrical angle).

On the other hand, each of the second magnetic flux barriers 36 is expanded in cross-sectional shape (or area) by recessing a radially outer half of a q-axis core portion 34-side (or upstream-side) wall surface of the second magnetic flux barrier 36 upstream in the direction of rotation of the rotor 30D from a radially inner half of the q-axis core portion 34-side wall surface. Consequently, for each of the second magnetic flux barriers 36, a radially outer and q-axis core portion 34-side corner 36b of the second magnetic flux barrier 36 is offset upstream in the direction of rotation of the rotor 30D from a radially inner and q-axis core portion 34-side corner 36a of the second magnetic flux barrier 36 by the predetermined offset angle θ.

As a result, for each of the magnetic poles, the pair of first and second magnetic flux barriers 35 and 36, which are located respectively on opposite circumferential sides of the pair of magnet-receiving holes 32a and 32b in which the pair of permanent magnets 33 forming the magnetic pole are respectively received, are formed asymmetrically with respect to the centerline C1 of the magnetic pole.

Moreover, with the above asymmetric formation of the first and second magnetic flux barriers 35 and 36, for each of the q-axis core portions 34 formed between the first and second magnetic flux barriers 35 and 36, the radially outer circumferential width center P2 of the q-axis core portion 34 is offset upstream in the direction of rotation of the rotor 30D from the radially inner circumferential width center P1 of the q-axis core portion 34 by the predetermined offset angle θ. Here, the radially outer circumferential width center P2 corresponds to the center of the circumferential distance between one circumferentially-adjacent pair of the radially outer and q-axis core portion 34-side corners 35b of the first magnetic flux barriers 35 and the radially outer and q-axis core portion 34-side corners 36b of the second magnetic flux barriers 36; the radially inner circumferential width center P1 corresponds to the center of the circumferential distance between one circumferentially-adjacent pair of the radially inner and q-axis core portion 34-side corners 35a of the first magnetic flux barriers 35 and the radially inner and q-axis core portion 34-side corners 36a of the second magnetic flux barriers 36.

Consequently, for each of the magnetic poles, the pair of q-axis core portions 34 which are located respectively on opposite circumferential sides of the magnetic pole are formed asymmetrically with respect to the centerline C1 of the magnetic pole.

In addition, as in the second embodiment, the predetermined offset angle θ is set to be greater than 0° and less than 6.9° in electrical angle.

The rotor 30D according to the present embodiment has the advantages of the rotor 30B according to the second embodiment as well as the advantages of the rotor 30C according to the third embodiment.

Fifth Embodiment

Figure 13:
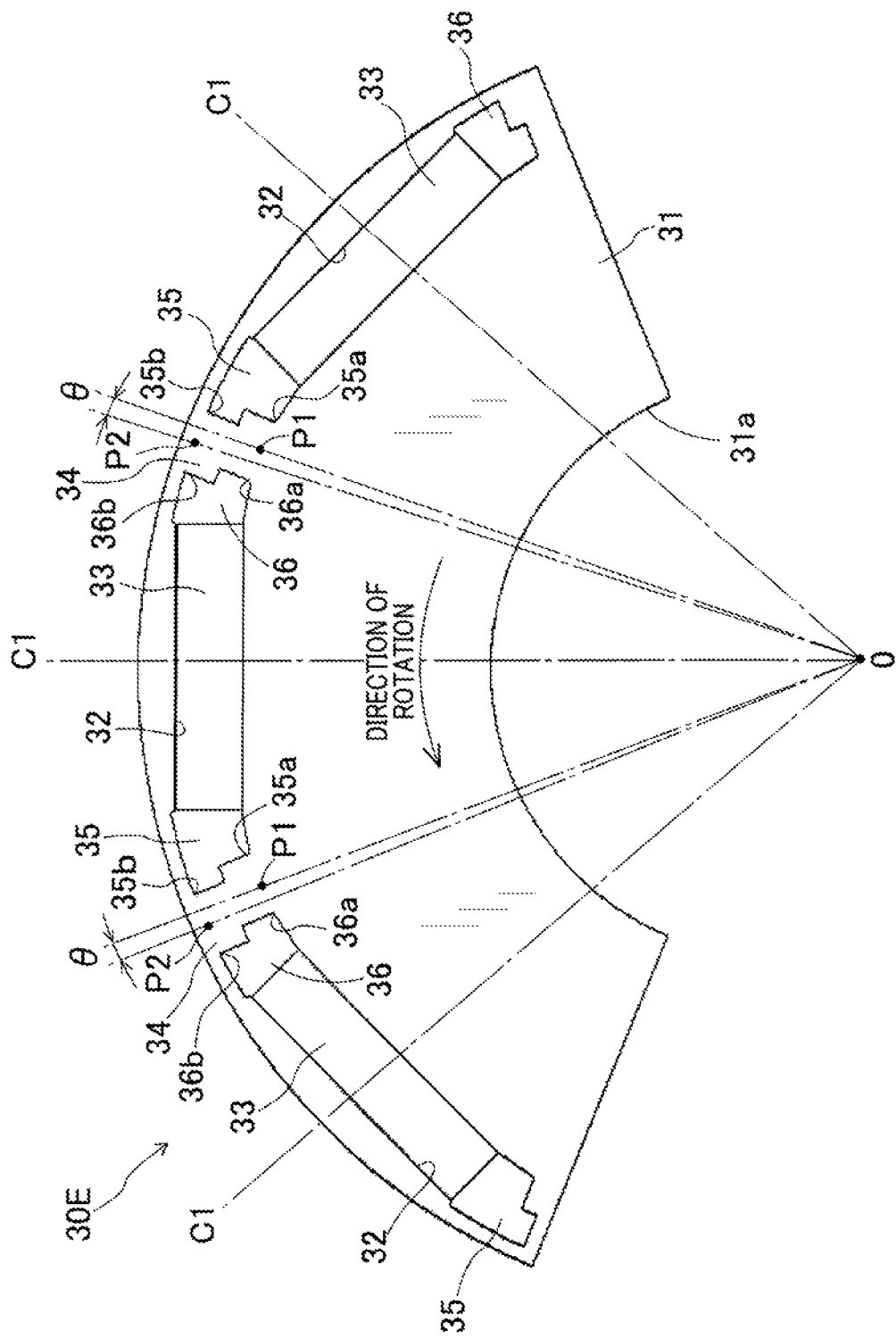
FIG. 13 is a plan view of part of a rotor according to a fifth embodiment, the part of the rotor including three magnetic poles.

FIG. 13 shows the configuration of a rotor 30E according to a fifth embodiment. The rotor 30E has almost the same structure as the rotor 30A according to the first embodiment. Therefore, the difference of the rotor 30E from the rotor 30A will be mainly described hereinafter.

In the first embodiment, for each of the q-axis core portions 34 of the rotor core 31, the radially outer circumferential width center P2 of the q-axis core portion 34 is offset upstream in the direction of rotation of the rotor 30A from the radially inner circumferential width center P1 of the q-axis core portion 34 (see FIG. 2).

In comparison, in the present embodiment, as shown in FIG. 13, for each of the q-axis core portions 34 of the rotor core 31, the radially outer circumferential width center P2 of the q-axis core portion 34 is offset downstream in the direction of rotation of the rotor 30E from the radially inner circumferential width center P1 of the q-axis core portion 34.

Specifically, in the rotor 30E according to the present embodiment, each of the q-axis core portions 34 of the rotor core 31 is formed between one circumferentially-adjacent pair of the magnetic poles having different polarities.

Moreover, each of the first magnetic flux barriers 35 is formed integrally with one of the magnet-receiving holes 32 so as to be continuous with the magnet-receiving hole 32 on the downstream side of the magnet-receiving hole 32 in the direction of rotation of the rotor 30E (i.e., on the left side of the magnet-receiving hole 32 in FIG. 13). That is, each of the first magnetic flux barriers 35 is formed as a magnetic void between one circumferentially-adjacent pair of the magnet-receiving holes 32 and the q-axis core portions 34.

On the other hand, each of the second magnetic flux barriers 36 is formed integrally with one of the magnet-receiving holes 32 so as to be continuous with the magnet-receiving hole 32 on the upstream side of the magnet-receiving hole 32 in the direction of rotation of the rotor 30E (i.e., on the right side of the magnet-receiving hole 32 in FIG. 13). That is, each of the second magnetic flux barriers 36 is also formed as a magnetic void between one circumferentially-adjacent pair of the magnet-receiving holes 32 and the q-axis core portions 34.

Moreover, in the present embodiment, the first magnetic flux barriers 35 have a different cross-sectional shape perpendicular to the axial direction of the rotor core 31 from the second magnetic flux barriers 36.

Specifically, each of the first magnetic flux barriers 35 is expanded in cross-sectional shape (or area) by recessing a radially outer half of a q-axis core portion 34-side (or downstream-side) wall surface of the first magnetic flux barrier 35 downstream in the direction of rotation of the rotor 30E from a radially inner half of the q-axis core portion 34-side wall surface. Consequently, for each of the first magnetic flux barriers 35, a radially outer and q-axis core portion 34-side corner 35b of the first magnetic flux barrier 35 is offset downstream in the direction of rotation of the rotor 30E from a radially inner and q-axis core portion 34-side corner 35a of the first magnetic flux barrier 35 by a predetermined offset angle θ (in electrical angle).

On the other hand, each of the second magnetic flux barriers 36 is reduced in cross-sectional shape (or area) by protruding a radially outer half of a q-axis core portion 34-side (or upstream-side) wall surface of the second magnetic flux barrier 36 downstream in the direction of rotation of the rotor 30E from a radially inner half of the q-axis core portion 34-side wall surface. Consequently, for each of the second magnetic flux barriers 36, a radially outer and q-axis core portion 34-side corner 36b of the second magnetic flux barrier 36 is offset downstream in the direction of rotation of the rotor 30E from a radially inner and q-axis core portion 34-side corner 36a of the second magnetic flux barrier 36 by the predetermined offset angle θ.

As a result, for each of the magnetic poles, the pair of first and second magnetic flux barriers 35 and 36, which are located respectively on opposite circumferential sides of the magnet-receiving hole 32 in which the permanent magnet 33 forming the magnetic pole is received, are formed asymmetrically with respect to the centerline C1 of the magnetic pole.

Moreover, with the above asymmetric formation of the first and second magnetic flux barriers 35 and 36, for each of the q-axis core portions 34 formed between the first and second magnetic flux barriers 35 and 36, the radially outer circumferential width center P2 of the q-axis core portion 34 is offset downstream in the direction of rotation of the rotor 30E from the radially inner circumferential width center P1 of the q-axis core portion 34 by the predetermined offset angle θ. Here, the radially outer circumferential width center P2 corresponds to the center of the circumferential distance between one circumferentially-adjacent pair of the radially outer and q-axis core portion 34-side corners 35b of the first magnetic flux barriers 35 and the radially outer and q-axis core portion 34-side corners 36b of the second magnetic flux barriers 36; the radially inner circumferential width center P1 corresponds to the center of the circumferential distance between one circumferentially-adjacent pair of the radially inner and q-axis core portion 34-side corners 35a of the first magnetic flux barriers 35 and the radially inner and q-axis core portion 34-side corners 36a of the second magnetic flux barriers 36.

Consequently, for each of the magnetic poles, the pair of q-axis core portions 34 which are located respectively on opposite circumferential sides of the magnetic pole are formed asymmetrically with respect to the centerline C1 of the magnetic pole.

In addition, in the present embodiment, the predetermined offset angle θ is set to be substantially 15° in electrical angle (i.e., θ≈15°).

Next, reduction of torque ripple in the rotating electric machine 1, which includes the rotor 30E according to the present embodiment, will be described.

As described previously in the first embodiment, the motor torque (or total output torque) of an IPM motor becomes maximum in the vicinity of the reluctance torque peaks of α≈45°, where a is the electric current lead angle. Moreover, when α=45, the phase of the magnet torque is 22.5° and the phase of the reluctance torque is 45°.

Figure 14:
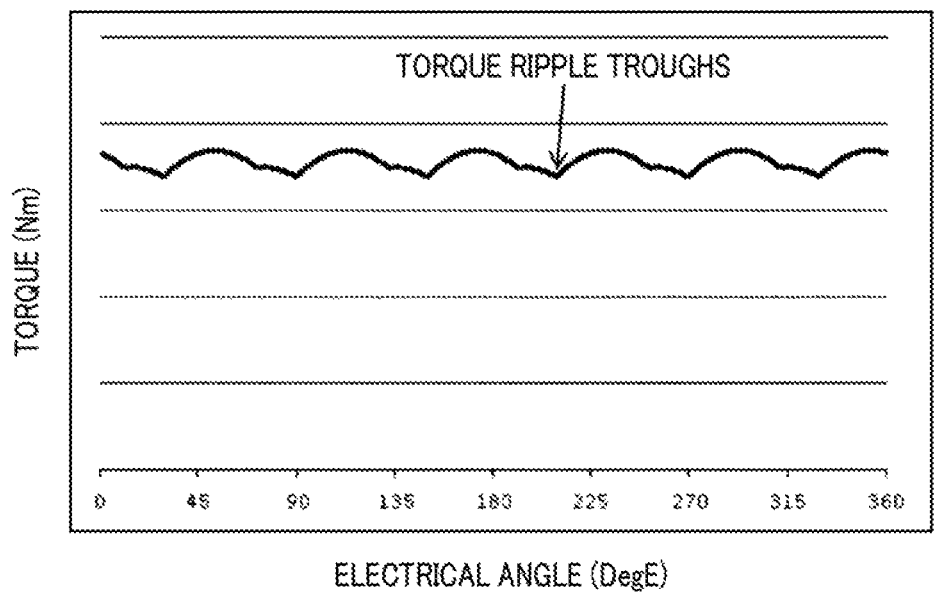
FIG. 14 is a characteristic chart illustrating the waveform of motor torque which is obtained by synthesizing the reluctance torque and the magnet torque shown in FIG. 3.

Consequently, as shown in FIG. 14, the difference in phase between the magnet torque and the reluctance torque is conventionally equal to 22.5°. Therefore, the magnet torque peaks are not at the centers of the torque ripple troughs in the waveform of the motor torque; thus the asymmetry of the waveform is high. In addition, the ideal difference in phase between the magnet torque and the reluctance torque is equal to 30° in electrical angle.

Figure 15:
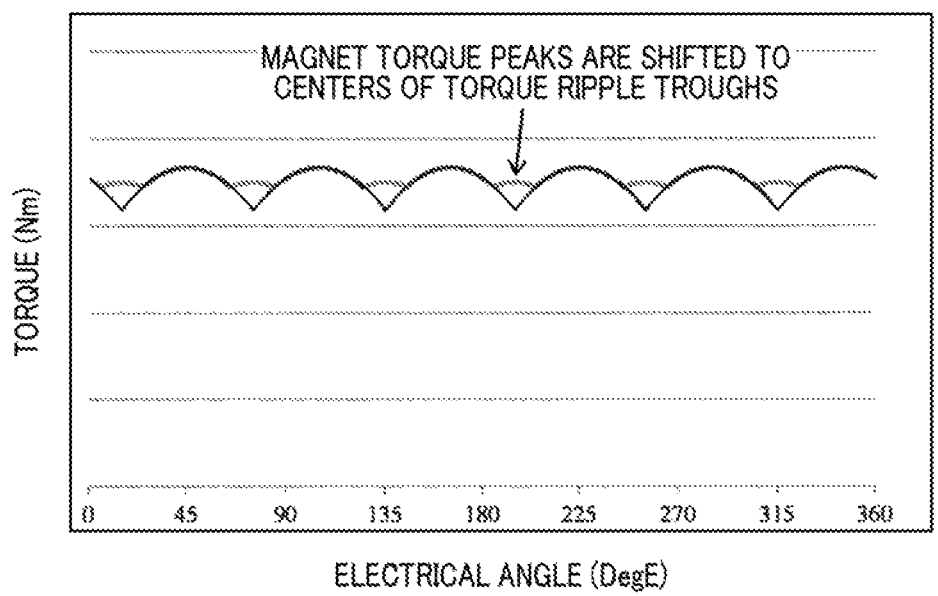
FIG. 15 is a characteristic chart illustrating both the motor torque waveforms before and after improvement according to the fifth embodiment.

Moreover, each of the magnet torque and the reluctance torque has its peaks or troughs every 60 degrees. In consideration of the above, in the present embodiment, the difference in phase between the magnet torque and the reluctance torque is changed from 22.5° to 30° and the periods of the magnet torque and the reluctance torque are changed from 60° to 30°, thereby reducing the torque ripple. That is, as shown in FIG. 15, the peaks of the magnet torque are shifted so as to be positioned at the centers of the torque ripple troughs, thereby reducing the torque ripple.

The above-described rotor 30E according to the present embodiment has the following advantages.

In the present embodiment, the rotor 30E includes the hollow cylindrical rotor 31 and the permanent magnets 33. The rotor core 31 has the magnet-receiving holes 32 arranged in the circumferential direction thereof. The permanent magnets 33 are received respectively in the magnet-receiving holes 32 of the rotor core 31 to form the magnetic poles the polarities of which alternate between north and south in the circumferential direction of the rotor core 31. Moreover, the rotor core 31 has the q-axis core portions 34 each of which is located between one circumferentially-adjacent pair of the magnetic poles. For each of the q-axis core portions 34, the radially outer circumferential width center P2 of the q-axis core portion 34 is offset downstream in the direction of rotation of the rotor 30E from the radially inner circumferential width center P1 of the q-axis core portion 34.

With the above configuration, it is possible to set the difference in phase between the magnet torque and the reluctance torque to the ideal phase difference of 30° in electrical angle. Consequently, it is possible to reduce the torque ripple and increase the motor torque.

Moreover, in the present embodiment, the rotor core 31 further has the first magnetic flux barriers 35 and the second magnetic flux barriers 36. Each of the first magnetic flux barriers 35 is formed between one circumferentially-adjacent pair of the magnet-receiving holes 32 and the q-axis core portions 34 of the rotor core 31 so as to be located downstream in the direction of rotation of the rotor 30E from the magnet-receiving hole 32 of the pair. Each of the second magnetic flux barriers 36 is formed between one circumferentially-adjacent pair of the magnet-receiving holes 32 and the q-axis core portions 34 of the rotor core 31 so as to be located upstream in the direction of rotation of the rotor 30E from the magnet-receiving hole 32 of the pair. For each of the first magnetic flux barriers 35, the radially outer and q-axis core portion 34-side corner 35b of the first magnetic flux barrier 35 is offset downstream in the direction of rotation of the rotor 30E from the radially inner and q-axis core portion 34-side corner 35a of the first magnetic flux barrier 35. For each of the second magnetic flux barriers 36, the radially outer and q-axis core portion 34-side corner 36b of the second magnetic flux barrier 36 is offset downstream in the direction of rotation of the rotor 30E from the radially inner and q-axis core portion 34-side corner 36a of the second magnetic flux barrier 36.

With the above configuration, it is possible to simply and reliably form each of the q-axis core portions 34 between one circumferentially-adjacent pair of the first and second magnetic flux barriers 35 and 36 such that the radially outer circumferential width center P2 of the q-axis core portion 34 is offset downstream in the direction of rotation of the rotor 30E from the radially inner circumferential width center P1 of the q-axis core portion 34.

In the present embodiment, for each of the magnetic poles, the pair of q-axis core portions 34 which are located respectively on opposite circumferential sides of the magnetic pole are formed asymmetrically with respect to the centerline C1 of the magnetic pole. Moreover, for each of the magnetic poles, the pair of first and second magnetic flux barriers 35 and 36, which are located respectively on opposite circumferential sides of the magnet-receiving hole 32 in which the permanent magnet 33 forming the magnetic pole is received, are formed asymmetrically with respect to the centerline C1 of the magnetic pole.

With the above configuration, it is possible to simply and reliably form each of the q-axis core portions 34 between one circumferentially-adjacent pair of the first and second magnetic flux barriers 35 and 36 such that the radially outer circumferential width center P2 of the q-axis core portion 34 is offset downstream in the direction of rotation of the rotor 30E from the radially inner circumferential width center P1 of the q-axis core portion 34.

In the present embodiment, for each of the q-axis core portions 34, the radially outer circumferential width center P2 of the q-axis core portion 34 is offset downstream in the direction of rotation of the rotor 30E from the radially inner circumferential width center P1 of the q-axis core portion 34 by the predetermined offset angle θ that is set to be substantially 15° in electrical angle.

Setting the predetermined offset angle θ as above, it is possible to easily and reliably set the difference in phase between the magnet torque and the reluctance torque to the ideal phase difference of 30° in electrical angle.

Sixth Embodiment

Figure 16:
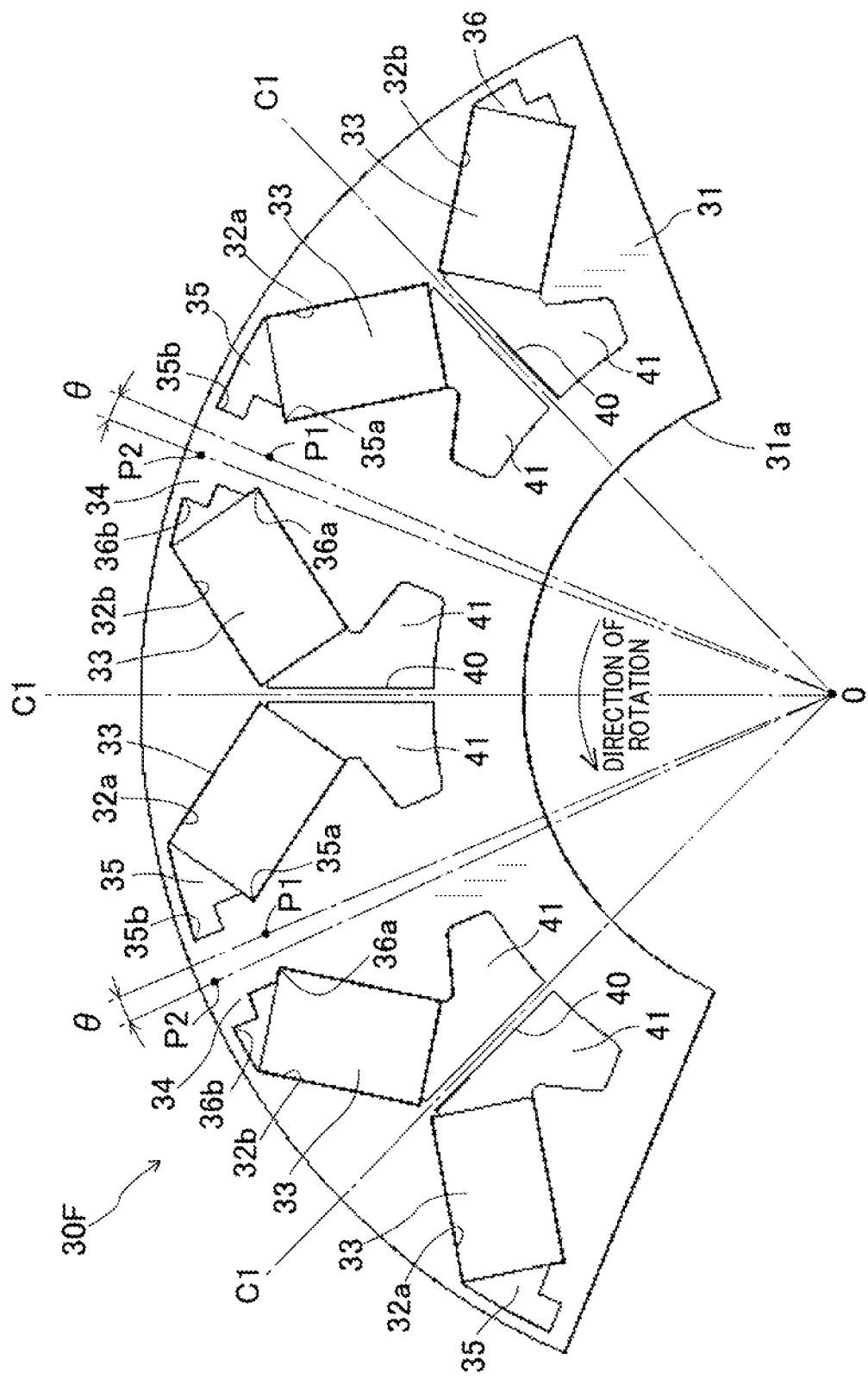
FIG. 16 is a plan view of part of a rotor according to a sixth embodiment, the part of the rotor including three magnetic poles.

FIG. 16 shows the configuration of a rotor 30F according to a sixth embodiment. The rotor 30F has almost the same structure as the rotor 30B according to the second embodiment. Therefore, the difference of the rotor 30F from the rotor 30B will be mainly described hereinafter.

In the second embodiment, for each of the q-axis core portions 34 of the rotor core 31, the radially outer circumferential width center P2 of the q-axis core portion 34 is offset upstream in the direction of rotation of the rotor 30B from the radially inner circumferential width center P1 of the q-axis core portion 34 (see FIG. 6).

In comparison, in the present embodiment, as shown in FIG. 16, for each of the q-axis core portions 34 of the rotor core 31, the radially outer circumferential width center P2 of the q-axis core portion 34 is offset downstream in the direction of rotation of the rotor 30F from the radially inner circumferential width center P1 of the q-axis core portion 34.

Specifically, in the rotor 30F according to the present embodiment, each of the q-axis core portions 34 of the rotor core 31 is formed between one circumferentially-adjacent pair of the magnetic poles having different polarities.

Moreover, each of the first magnetic flux barriers 35 is formed integrally with one of the magnet-receiving holes 32a so as to be continuous with the magnet-receiving hole 32a on the downstream side of the magnet-receiving hole 32a in the direction of rotation of the rotor 30F (i.e., on the left side of the magnet-receiving hole 32a in FIG. 16). That is, each of the first magnetic flux barriers 35 is formed as a magnetic void between one circumferentially-adjacent pair of the magnet-receiving holes 32a and the q-axis core portions 34.

On the other hand, each of the second magnetic flux barriers 36 is formed integrally with one of the magnet-receiving holes 32b so as to be continuous with the magnet-receiving hole 32b on the upstream side of the magnet-receiving hole 32b in the direction of rotation of the rotor 30F (i.e., on the right side of the magnet-receiving hole 32b in FIG. 16). That is, each of the second magnetic flux barriers 36 is formed as a magnetic void between one circumferentially-adjacent pair of the magnet-receiving holes 32b and the q-axis core portions 34.

Moreover, in the present embodiment, the first magnetic flux barriers 35 have a different cross-sectional shape perpendicular to the axial direction of the rotor core 31 from the second magnetic flux barriers 36.

Specifically, each of the first magnetic flux barriers 35 is expanded in cross-sectional shape (or area) by recessing a radially outer half of a q-axis core portion 34-side (or downstream-side) wall surface of the first magnetic flux barrier 35 downstream in the direction of rotation of the rotor 30F from a radially inner half of the q-axis core portion 34-side wall surface. Consequently, for each of the first magnetic flux barriers 35, a radially outer and q-axis core portion 34-side corner 35b of the first magnetic flux barrier 35 is offset downstream in the direction of rotation of the rotor 30F from a radially inner and q-axis core portion 34-side corner 35a of the first magnetic flux barrier 35 by a predetermined offset angle θ (in electrical angle).

On the other hand, each of the second magnetic flux barriers 36 is reduced in cross-sectional shape (or area) by protruding a radially outer half of a q-axis core portion 34-side (or upstream-side) wall surface of the second magnetic flux barrier 36 downstream in the direction of rotation of the rotor 30F from a radially inner half of the q-axis core portion 34-side wall surface. Consequently, for each of the second magnetic flux barriers 36, a radially outer and q-axis core portion 34-side corner 36b of the second magnetic flux barrier 36 is offset downstream in the direction of rotation of the rotor 30F from a radially inner and q-axis core portion 34-side corner 36a of the second magnetic flux barrier 36 by the predetermined offset angle θ.

As a result, for each of the magnetic poles, the pair of first and second magnetic flux barriers 35 and 36, which are located respectively on opposite circumferential sides of the pair of magnet-receiving holes 32a and 32b in which the pair of permanent magnets 33 forming the magnetic pole are respectively received, are formed asymmetrically with respect to the centerline C1 of the magnetic pole.

Moreover, with the above asymmetric formation of the first and second magnetic flux barriers 35 and 36, for each of the q-axis core portions 34 formed between the first and second magnetic flux barriers 35 and 36, the radially outer circumferential width center P2 of the q-axis core portion 34 is offset downstream in the direction of rotation of the rotor 30F from the radially inner circumferential width center P1 of the q-axis core portion 34 by the predetermined offset angle θ. Here, the radially outer circumferential width center P2 corresponds to the center of the circumferential distance between one circumferentially-adjacent pair of the radially outer and q-axis core portion 34-side corners 35b of the first magnetic flux barriers 35 and the radially outer and q-axis core portion 34-side corners 36b of the second magnetic flux barriers 36; the radially inner circumferential width center P1 corresponds to the center of the circumferential distance between one circumferentially-adjacent pair of the radially inner and q-axis core portion 34-side corners 35a of the first magnetic flux barriers 35 and the radially inner and q-axis core portion 34-side corners 36a of the second magnetic flux barriers 36.

Consequently, for each of the magnetic poles, the pair of q-axis core portions 34 which are located respectively on opposite circumferential sides of the magnetic pole are formed asymmetrically with respect to the centerline C1 of the magnetic pole.

In addition, in the present embodiment, the predetermined offset angle θ is set to be greater than 0° and less than 6.9° in electrical angle.

The rotor 30F according to the present embodiment has the same advantages as the rotor 30E according to the fifth embodiment.

Seventh Embodiment

Figure 17:
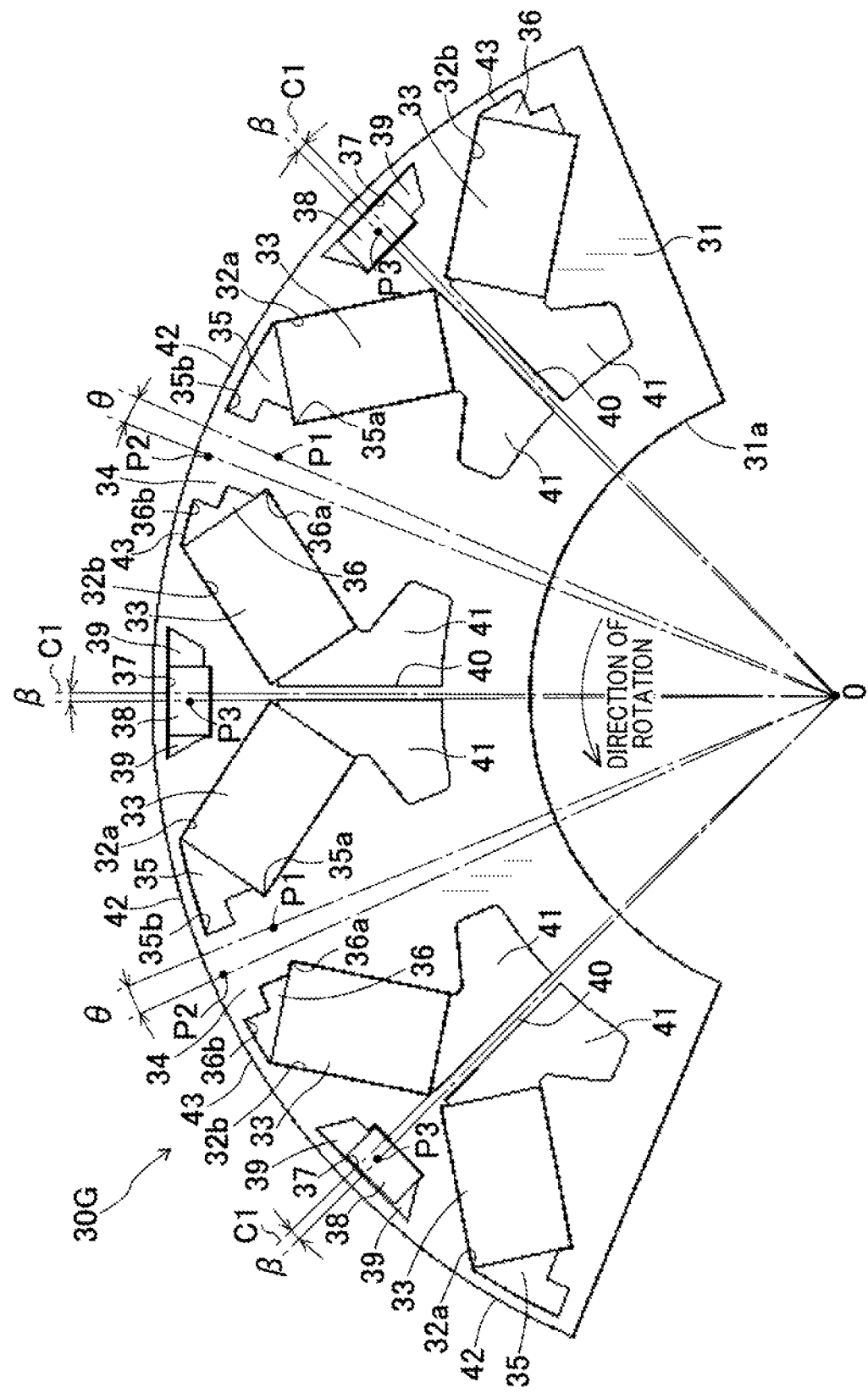
FIG. 17 is a plan view of part of a rotor according to a seventh embodiment, the part of the rotor including three magnetic poles.

FIG. 17 shows the configuration of a rotor 30G according to a seventh embodiment. The rotor 30G is a combination of the rotor 30C according to the third embodiment (see FIG. 9) and the rotor 30F according to the sixth embodiment (see FIG. 16).

Specifically, the rotor 30G according to the present embodiment differs from the rotor 30C according to the third embodiment only in that for each of the q-axis core portions 34 of the rotor core 31, the radially outer circumferential width center P2 of the q-axis core portion 34 is offset downstream in the direction of rotation of the rotor 30G from the radially inner circumferential width center P1 of the q-axis core portion 34. Therefore, the difference of the rotor 30G from the rotor 30C will be mainly described hereinafter.

As shown in FIG. 17, in the rotor 30G according to the present embodiment, each of the q-axis core portions 34 is formed between one circumferentially-adjacent pair of the magnetic poles having different polarities.

Moreover, as in the sixth embodiment, each of the first magnetic flux barriers 35 is formed integrally with one of the magnet-receiving holes 32a so as to be continuous with the magnet-receiving hole 32a on the downstream side of the magnet-receiving hole 32a in the direction of rotation of the rotor 30G (i.e., on the left side of the magnet-receiving hole 32a in FIG. 17). That is, each of the first magnetic flux barriers 35 is formed as a magnetic void between one circumferentially-adjacent pair of the magnet-receiving holes 32a and the q-axis core portions 34.

On the other hand, each of the second magnetic flux barriers 36 is formed integrally with one of the magnet-receiving holes 32b so as to be continuous with the magnet-receiving hole 32b on the upstream side of the magnet-receiving hole 32b in the direction of rotation of the rotor 30G (i.e., on the right side of the magnet-receiving hole 32b in FIG. 17). That is, each of the second magnetic flux barriers 36 is formed as a magnetic void between one circumferentially-adjacent pair of the magnet-receiving holes 32b and the q-axis core portions 34.

Moreover, as in the sixth embodiment, the first magnetic flux barriers 35 have a different cross-sectional shape perpendicular to the axial direction of the rotor core 31 from the second magnetic flux barriers 36.

Specifically, each of the first magnetic flux barriers 35 is expanded in cross-sectional shape (or area) by recessing a radially outer half of a q-axis core portion 34-side (or downstream-side) wall surface of the first magnetic flux barrier 35 downstream in the direction of rotation of the rotor 30G from a radially inner half of the q-axis core portion 34-side wall surface. Consequently, for each of the first magnetic flux barriers 35, a radially outer and q-axis core portion 34-side corner 35b of the first magnetic flux barrier 35 is offset downstream in the direction of rotation of the rotor 30G from a radially inner and q-axis core portion 34-side corner 35a of the first magnetic flux barrier 35 by a predetermined offset angle θ (in electrical angle). In addition, first radially-outside bridges 42 of the rotor core 31, each of which is formed radially outside one of the first magnetic flux barriers 35, are extended by the amount by which the first magnetic flux barriers 35 are expanded downstream in the direction of rotation of the rotor 30G.

On the other hand, each of the second magnetic flux barriers 36 is reduced in cross-sectional shape (or area) by protruding a radially outer half of a q-axis core portion 34-side (or upstream-side) wall surface of the second magnetic flux barrier 36 downstream in the direction of rotation of the rotor 30G from a radially inner half of the q-axis core portion 34-side wall surface. Consequently, for each of the second magnetic flux barriers 36, a radially outer and q-axis core portion 34-side corner 36b of the second magnetic flux barrier 36 is offset downstream in the direction of rotation of the rotor 30G from a radially inner and q-axis core portion 34-side corner 36a of the second magnetic flux barrier 36 by the predetermined offset angle θ. In addition, second radially-outside bridges 43 of the rotor core 31, each of which is formed radially outside one of the second magnetic flux barriers 36, are shortened by the amount by which the second magnetic flux barriers 36 are reduced downstream in the direction of rotation of the rotor 30G.

As a result, for each of the magnetic poles, the pair of first and second magnetic flux barriers 35 and 36, which are located respectively on opposite circumferential sides of the pair of magnet-receiving holes 32a and 32b in which the pair of permanent magnets 33 forming the magnetic pole are respectively received, are formed asymmetrically with respect to the centerline C1 of the magnetic pole.

Moreover, with the above asymmetric formation of the first and second magnetic flux barriers 35 and 36, for each of the q-axis core portions 34 formed between the first and second magnetic flux barriers 35 and 36, the radially outer circumferential width center P2 of the q-axis core portion 34 is offset downstream in the direction of rotation of the rotor 30G from the radially inner circumferential width center P1 of the q-axis core portion 34 by the predetermined offset angle θ. Here, the radially outer circumferential width center P2 corresponds to the center of the circumferential distance between one circumferentially-adjacent pair of the radially outer and q-axis core portion 34-side corners 35b of the first magnetic flux barriers 35 and the radially outer and q-axis core portion 34-side corners 36b of the second magnetic flux barriers 36; the radially inner circumferential width center P1 corresponds to the center of the circumferential distance between one circumferentially-adjacent pair of the radially inner and q-axis core portion 34-side corners 35a of the first magnetic flux barriers 35 and the radially inner and q-axis core portion 34-side corners 36a of the second magnetic flux barriers 36.

Consequently, for each of the magnetic poles, the pair of q-axis core portions 34 which are located respectively on opposite circumferential sides of the magnetic pole are formed asymmetrically with respect to the centerline C1 of the magnetic pole.

In addition, in the present embodiment, the predetermined offset angle θ is set to be greater than 0° and less than 6.9° in electrical angle as in the sixth embodiment.

Moreover, as in the third embodiment, each of the center magnets 38 is received in one of the center magnet-receiving holes 37 of the rotor core 31 so that the center P3 of the center magnet 38 is offset downstream in the direction of rotation of the rotor 30G (i.e., offset to the left side in FIG. 17) from the centerline C1 of the magnetic pole by a predetermined offset angle β.

However, in the present embodiment, the predetermined offset angle β is set to be substantially 7.5° in electrical angle, not to be less than 6.9° in electrical angle as in the third embodiment.

That is, in the present embodiment, the sum of the predetermined offset angle θ and the predetermined offset angle β is set so as to cause the phases of the reluctance torque and the magnet torque to be shifted away from each other, thereby having the difference in phase between the reluctance torque and the magnet torque substantially equal to 30° in electrical angle.

The above-described rotor 30G according to the present embodiment has the following advantages.

In the present embodiment, for each of the q-axis core portions 34 of the rotor core 31, the radially outer circumferential width center P2 of the q-axis core portion 34 is offset downstream in the direction of rotation of the rotor 30G from the radially inner circumferential width center P1 of the q-axis core portion 34. Consequently, it is possible to achieve the same advantages as described in the fifth embodiment.

Moreover, in the present embodiment, each of the center magnets 38 is received in one of the center magnet-receiving holes 37 of the rotor core 31 so that the center P3 of the center magnet 38 is offset downstream in the direction of rotation of the rotor 30G from the centerline C1 of the magnetic pole that is formed by the pair of permanent magnets 33 located respectively on opposite circumferential sides of the center magnet 38. Consequently, it is possible to further achieve the same advantages as described in the third embodiment.

In addition, due to the offset of the center P3 of the center magnet 38 downstream in the direction of rotation of the rotor 30G from the centerline C1 of the magnetic pole, the centrifugal force acting on the center magnet 38 during rotation of the rotor 30G becomes greater at the q-axis core portion 34 and the first radially-outside bridge 42 on the downstream side of the center magnet 38 than the q-axis core portion 34 and the second radially-outside bridge 43 on the upstream side of the center magnet 38 in the direction of rotation of the rotor 30G. However, in the present embodiment, the first radially-outside bridge 42 is extended whereas the second radially-outside bridge 43 is shortened. Consequently, it is possible to disperse the centrifugal force acting on the first radially-outside bridge 42, thereby preventing stress concentration from occurring in the rotor core 31.

Moreover, in the present embodiment, the sum of the predetermined offset angle θ (θ<6.9° in electrical angle) and the predetermined offset angle f (β=7.5° in electrical angle) is set so as to cause the phases of the reluctance torque and the magnet torque to be shifted away from each other.

Consequently, it becomes possible to easily realize the ideal phase difference of 30° in electrical angle between the reluctance torque and the magnet torque.

While the above particular embodiments have been shown and described, it will be understood by those skilled in the art that various modifications, changes, and improvements may be made without departing from the spirit of the present invention.

For example, in the previous embodiments, the present invention is directed to the rotors 30A-30G for the rotating electric machine 1 that is configured as an IPM motor for use in a motor vehicle. However, the present invention can also be applied to rotors for other rotating electric machines, such as a rotor for an electric generator or a rotor for a motor-generator that can selectively function either as an electric motor or as an electric generator.

What is claimed is:

1. A rotor for a rotating electric machine, the rotor comprising:
a hollow cylindrical rotor core having a plurality of pairs of magnet-receiving holes arranged in a circumferential direction thereof, each pair of the magnet-receiving holes being formed in a substantially V-shape that opens toward a radially outer periphery of the rotor core; and
a plurality of pairs of permanent magnets, each pair of the permanent magnets being received in one of the substantially V-shaped pairs of magnet-receiving holes of the rotor core to form one magnetic pole, the magnetic pole having a centerline that radially extends through a rotational axis of the rotor core so as to circumferentially bisect the magnetic pole;
wherein:
the rotor core further has a plurality of center magnet-receiving holes, each of the center magnet-receiving holes being formed in a radially outer peripheral portion of the rotor core so as to be circumferentially centered between one of the substantially V-shaped pairs of magnet-receiving holes;
the rotor further comprises a plurality of center magnets, each of the center magnets being received in one of the center magnet-receiving holes of the rotor core so that a center of the center magnet is offset in a direction of rotation of the rotor from the centerline of the magnetic pole that is formed by the pair of permanent magnets located respectively on opposite circumferential sides of the center magnet;
for each of the magnetic poles, the pair of permanent magnets forming the magnetic pole as well as the pair of magnet-receiving holes having the pair of permanent magnets received therein are arranged symmetrically with respect to the centerline of the magnetic pole;
in a total output torque of the rotating electric machine, a percentage of reluctance torque is higher than a percentage of magnet torque; and
for each of the center magnets, the center of the center magnet is offset downstream in the direction of rotation of the rotor from the centerline of the magnetic pole.

2. The rotor as set forth in claim 1, wherein for each of the center magnets, the center of the center magnet is offset downstream in the direction of rotation of the rotor from the centerline of the magnetic pole by a predetermined offset angle β that is less than 6.9° in electrical angle.

3. The rotor as set forth in claim 1, wherein the rotor core further has a plurality of q-axis core portions each of which is located between one circumferentially-adjacent pair of the magnetic poles, and for each of the q-axis core portions, a radially outer circumferential width center of the q-axis core portion is offset upstream in the direction of rotation of the rotor from a radially inner circumferential width center of the q-axis core portion.

4. The rotor as set forth in claim 3, wherein for each of the q-axis core portions, the radially outer circumferential width center of the q-axis core portion is offset upstream in the direction of rotation of the rotor from the radially inner circumferential width center of the q-axis core portion by a predetermined offset angle θ that is not less than 2° and not greater than 4° in electrical angle.

5. A rotor for a rotating electric machine, the rotor comprising:

a hollow cylindrical rotor core having a plurality of pairs of magnet-receiving holes arranged in a circumferential direction thereof, each pair of the magnet-receiving holes being formed in a substantially V-shape that opens toward a radially outer periphery of the rotor core; and a plurality of pairs of permanent magnets, each pair of the permanent magnets being received in one of the substantially V-shaped pairs of magnet-receiving holes of the rotor core to form one magnetic pole, the magnetic pole having a centerline that radially extends through a rotational axis of the rotor core so as to circumferentially bisect the magnetic pole;

wherein:

the rotor core further has a plurality of center magnet-receiving holes, each of the center magnet-receiving holes being formed in a radially outer peripheral portion of the rotor core so as to be circumferentially centered between one of the substantially V-shaped pairs of magnet-receiving holes;

the rotor further comprises a plurality of center magnets, each of the center magnets being received in one of the center magnet-receiving holes of the rotor core so that a center of the center magnet is offset in a direction of rotation of the rotor from the centerline of the magnetic pole that is formed by the pair of permanent magnets located respectively on opposite circumferential sides of the center magnet;

the rotor core further has a plurality of q-axis core portions, each of the q-axis core portions being located between one circumferentially-adjacent pair of the magnetic poles;

for each of the q-axis core portions, a radially outer circumferential width center of the q-axis core portion is offset downstream in the direction of rotation of the rotor from a radially inner circumferential width center of the q-axis core portion; and for each of the center magnets, the center of the center magnet is offset downstream in the direction of rotation of the rotor from the centerline of the magnetic pole;

the rotor core further has a plurality of first magnetic flux barriers and a plurality of second magnetic flux barriers;

each of the first magnetic flux barriers is formed between one circumferentially-adjacent pair of the magnet-receiving holes and the q-axis core portions of the rotor core so as to be located downstream in the direction of rotation of the rotor from the magnet-receiving hole of the pair;

each of the second magnetic flux barriers is formed between one circumferentially-adjacent pair of the magnet-receiving holes and the q-axis core portions of the rotor core so as to be located upstream in the direction of rotation of the rotor from the magnet-receiving hole of the pair;

for each of the first and second magnetic flux barriers, a radially outer corner on the q-axis core portion side of the magnetic flux barrier is offset downstream in the direction of rotation of the rotor from a radially inner corner on the q-axis core portion side of the magnetic flux barrier;

for each of the first magnetic flux barriers, a radially outer half of a q-axis core portion-side wall surface of the first magnetic flux barrier is recessed downward in the direction of rotation of the rotor from a radially inner half of the q-axis core portion-side wall surface of the first magnetic flux barrier; and for each of the second magnetic flux barriers, a radially outer half of a q-axis core portion-side wall surface of the second magnetic flux barrier protrudes downward in the direction of rotation of the rotor from a radially inner half of the q-axis core portion-side wall surface of the second magnetic flux barrier.

6. The rotor as set forth in claim 5, wherein for each of the center magnets, the center of the center magnet is offset downstream in the direction of rotation of the rotor from the centerline of the magnetic pole by a predetermined offset angle θ that is substantially 7.5° in electrical angle.

7. A rotor for a rotating electric machine, the rotor comprising:

a hollow cylindrical rotor core having a plurality of pairs of magnet-receiving holes arranged in a circumferential direction thereof, each pair of the magnet-receiving holes being formed in a substantially V-shape that opens toward a radially outer periphery of the rotor core; and a plurality of pairs of permanent magnets, each pair of the permanent magnets being received in one of the substantially V-shaped pairs of magnet-receiving holes of the rotor core to form one magnetic pole, the magnetic pole having a centerline that radially extends through a rotational axis of the rotor core so as to circumferentially bisect the magnetic pole;

wherein:

the rotor core further has a plurality of center magnet-receiving holes, each of the center magnet-receiving holes being formed in a radially outer peripheral portion of the rotor core so as to be circumferentially centered between one of the substantially V-shaped pairs of magnet-receiving holes;

the rotor further comprises a plurality of center magnets, each of the center magnets being received in one of the center magnet-receiving holes of the rotor core so that a center of the center magnet is offset in a direction of rotation of the rotor from the centerline of the magnetic pole that is formed by the pair of permanent magnets located respectively on opposite circumferential sides of the center magnet;

the rotor core further has a plurality of q-axis core portions, each of the q-axis core portions being located between one circumferentially-adjacent pair of the magnetic poles;

for each of the q-axis core portions, a radially outer circumferential width center of the q-axis core portion is circumferentially offset by a predetermined offset angle θ from a radially inner circumferential width center of the q-axis core portion;

for each of the center magnets, the center of the center magnet is circumferentially offset by a predetermined offset angle β from the centerline of the magnetic pole; and a sum of the predetermined offset angle θ and the predetermined offset angle β is set so as to have a difference in phase between reluctance torque and magnet torque of the rotating electric machine substantially equal to 30° in electrical angle.

8. The rotor as set forth in claim 7, wherein for each of the q-axis core portions, the radially outer circumferential width center of the q-axis core portion is offset downstream in a direction of rotation of the rotor from the radially inner circumferential width center of the q-axis core portion by the predetermined offset angle θ, and for each of the center magnets, the center of the center magnet is offset also downstream in the direction of rotation of the rotor from the centerline of the magnetic pole by the predetermined offset angle β.

* * * * *